US012731903B2

(12) United States Patent
Fang et al.

(10) Patent No.: US 12,731,903 B2
(45) Date of Patent: Sep. 8, 2026

(54) COMPACT PRINTED CIRCUIT BOARD IMPLEMENTED ANTENNA

(71) Applicant: Honeywell International Inc., Charlotte, NC (US)

(72) Inventors: Bo Fang, Tianjin (CN); Xueqin Shen, Tianjin (CN); Yi Bin Wu, Tianjin (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 19/013,957

(22) Filed: Jan. 8, 2025

(65) Prior Publication Data

US 2025/0239756 A1 Jul. 24, 2025

(30) Foreign Application Priority Data

Jan. 19, 2024 (WO) ................ PCT/CN2024/073188

(51) Int. Cl.

*H01Q 9/42* (2006.01)
*H01Q 1/22* (2006.01)
*H01Q 1/38* (2006.01)

(52) U.S. Cl.

CPC ............. *H01Q 9/42* (2013.01); *H01Q 1/2291* (2013.01); *H01Q 1/38* (2013.01)

(58) Field of Classification Search

CPC ........... H01Q 1/2291; H01Q 1/38; H01Q 9/42
See application file for complete search history.

(56) References Cited

U.S. PATENT DOCUMENTS

| | | | |
|---|---|---|---|
| 191,512 | A | 6/1877 | Bennett |
| 2,016,004 | A | 10/1935 | Gay |
| 3,974,492 | A | 8/1976 | Girismen |
| 4,009,647 | A | 3/1977 | Howorth |
| 4,046,532 | A | 9/1977 | Nelson |
| 4,341,345 | A | 7/1982 | Hammer et al. |
| 4,345,162 | A | 8/1982 | Hammer et al. |

(Continued)

FOREIGN PATENT DOCUMENTS

| | | | |
|---|---|---|---|
| CA | 2387100 | A1 | 11/2003 |
| CA | 2538139 | A1 | 3/2005 |

(Continued)

OTHER PUBLICATIONS

Li et al., "How Agile is the Adaptive Data Rate Mechanism of LoRaWAN?" IEEE, 6 pages, 2018. Downloaded Aug. 28, 2018.

(Continued)

*Primary Examiner* — Robert Karacsony
(74) *Attorney, Agent, or Firm* — Seager, Tufte & Wickhem, LLP

(57) ABSTRACT

A printed circuit board-implemented antenna may be used in a smart socket. The printed circuit board implemented-antenna includes a plurality of antenna legs arranged within a rectangular area on a printed circuit board of less than 80 square millimeters with each of the plurality of antenna legs formed using one or more metal layers of the printed circuit board, the plurality of antenna legs arranged to provide a return loss of less then −10 dB at 2.4 GHz. The printed circuit board-implemented antenna may be disposed within the smart socket in such a way as to ensure that there are no packaged electrical components in front of or behind the printed circuit board-implemented antenna.

10 Claims, 26 Drawing Sheets

(56) References Cited

U.S. PATENT DOCUMENTS 4,375,637 A 3/1983 Desjardins
4,389,577 A 6/1983 Anderson et al.
4,412,284 A 10/1983 Kerforne et al.
4,523,295 A 6/1985 Zato
4,531,214 A 7/1985 Torres et al.
4,577,977 A 3/1986 Pejsa
4,644,320 A 2/1987 Carr et al.
4,918,615 A 4/1990 Suzuki et al.
4,924,404 A 5/1990 Reinke, Jr.
4,939,922 A 7/1990 Smalley et al.
5,012,406 A 4/1991 Martin
5,315,533 A 5/1994 Stich et al.
5,493,191 A 2/1996 Phoy et al.
5,519,295 A 5/1996 Jatnieks
5,553,094 A 9/1996 Johnson et al.
5,566,084 A 10/1996 Cmar
5,598,349 A 1/1997 Elliason et al.
5,621,256 A 4/1997 Crane et al.
5,727,579 A 3/1998 Chardack
5,745,126 A 4/1998 Jain et al.
5,751,916 A 5/1998 Kon et al.
5,777,598 A 7/1998 Gowda et al.
5,793,125 A 8/1998 Tarng
5,973,662 A 10/1999 Singers et al.
5,990,932 A 11/1999 Bee et al.
6,065,842 A 5/2000 Fink
6,078,970 A 6/2000 Nordstrom et al.
6,139,177 A 10/2000 Venkatraman et al.
6,144,993 A 11/2000 Fukunaga et al.
6,157,943 A 12/2000 Meyer
6,218,995 B1 4/2001 Higgins et al.
6,222,714 B1 4/2001 Hoffman
6,229,429 B1 5/2001 Horon
6,238,337 B1 5/2001 Kambhatla et al.
6,249,100 B1 6/2001 Lange
6,262,496 B1 7/2001 Lamar et al.
6,262,685 B1 7/2001 Welch et al.
6,334,211 B1 12/2001 Kojima et al.
6,353,853 B1 3/2002 Gravlin
6,369,695 B2 4/2002 Horon
6,375,038 B1 4/2002 Daansen et al.
6,429,868 B1 8/2002 Dehner et al.
6,473,084 B1 10/2002 Phillips et al.
6,487,457 B1 11/2002 Hull et al.
6,532,195 B1 3/2003 Head
6,552,525 B2 4/2003 Bessler
6,574,581 B1 6/2003 Bohrer et al.
6,580,950 B1 6/2003 Johnson et al.
6,598,056 B1 7/2003 Hull et al.
6,619,555 B2 9/2003 Rosen
6,704,012 B1 3/2004 Lefave
6,720,874 B2 4/2004 Fufidio et al.
6,741,915 B2 5/2004 Poth
6,796,896 B2 9/2004 Laiti
6,801,199 B1 10/2004 Wallman
6,816,878 B1 11/2004 Zimmers et al.
6,838,978 B2 1/2005 Aizu et al.
6,876,951 B2 4/2005 Skidmore et al.
6,882,278 B2 4/2005 Winings et al.
6,885,185 B1 4/2005 Makinson et al.
6,904,385 B1 6/2005 Budike, Jr.
6,907,387 B1 6/2005 Reardon
6,911,177 B2 6/2005 Deal
6,931,445 B2 8/2005 Davis
6,975,958 B2 12/2005 Bohrer et al.
6,993,403 B1 1/2006 Dadebo et al.
6,993,417 B2 1/2006 Osann, Jr.
7,023,440 B1 4/2006 Havekost et al.
7,031,880 B1 4/2006 Seem et al.
7,058,524 B2 6/2006 Hayes et al.
7,062,722 B1 6/2006 Carlin et al.
7,110,843 B2 9/2006 Pagnano et al.
7,129,900 B2 10/2006 De Angelis
7,139,685 B2 11/2006 Bascle et al.
7,164,972 B2 1/2007 Imhof et al.
7,183,899 B2 2/2007 Behnke
7,196,673 B2 3/2007 Savage et al.
7,200,639 B1 4/2007 Yoshida
7,222,111 B1 5/2007 Budike, Jr.
7,222,800 B2 5/2007 Wruck
7,257,397 B2 8/2007 Shamoon et al.
7,280,030 B1 10/2007 Monaco
7,292,908 B2 11/2007 Borne et al.
7,295,116 B2 11/2007 Kumar et al.
7,302,313 B2 11/2007 Sharp et al.
7,308,323 B2 12/2007 Kruk et al.
7,308,388 B2 12/2007 Beverina et al.
7,313,447 B2 12/2007 Hsiung et al.
7,317,404 B2 1/2008 Cumeralto et al.
7,346,433 B2 3/2008 Budike, Jr.
7,346,467 B2 3/2008 Bohrer et al.
7,356,548 B1 4/2008 Culp et al.
7,372,373 B2 5/2008 Borisov et al.
7,379,782 B1 5/2008 Cocco
7,379,997 B2 5/2008 Ehlers et al.
7,383,148 B2 6/2008 Ahmed
7,392,115 B2 6/2008 Schindler
7,425,924 B2 9/2008 Chung et al.
7,434,742 B2 10/2008 Mueller et al.
7,447,333 B1 11/2008 Masticola et al.
7,453,373 B2 11/2008 Cumeralto et al.
7,466,224 B2 12/2008 Ward et al.
7,496,472 B2 2/2009 Seem
7,512,450 B2 3/2009 Ahmed
7,516,490 B2 4/2009 Riordan et al.
7,527,519 B2 5/2009 Van Dyne
7,548,833 B2 6/2009 Ahmed
7,551,092 B1 6/2009 Henry
7,557,729 B2 7/2009 Hubbard et al.
7,567,844 B2 7/2009 Thomas et al.
7,596,473 B2 9/2009 Hansen et al.
7,603,222 B2 10/2009 Wiseman et al.
7,610,910 B2 11/2009 Ahmed
7,626,507 B2 12/2009 Lacasse
7,664,574 B2 2/2010 Imhof et al.
7,671,814 B2 3/2010 Savage et al.
7,682,464 B2 3/2010 Glenn et al.
7,702,421 B2 4/2010 Sullivan et al.
7,729,882 B2 6/2010 Seem
7,755,494 B2 7/2010 Melker et al.
7,761,310 B2 7/2010 Rodgers
7,774,227 B2 8/2010 Srivastava
7,797,188 B2 9/2010 Srivastava
7,819,136 B1 10/2010 Eddy
7,822,806 B2 10/2010 Frank et al.
7,856,370 B2 12/2010 Katta et al.
7,973,673 B2 7/2011 Payne et al.
7,978,083 B2 7/2011 Melker et al.
7,984,384 B2 7/2011 Chaudhri et al.
7,986,323 B2 7/2011 Kobayashi et al.
7,994,990 B2 8/2011 Stoufer et al.
7,994,994 B2 8/2011 Savage et al.
8,024,666 B2 9/2011 Thompson
8,084,982 B2 12/2011 Grabinger et al.
8,086,047 B2 12/2011 Penke et al.
8,099,178 B2 1/2012 Mairs et al.
8,129,859 B2 3/2012 Pien
8,151,280 B2 4/2012 Sather et al.
8,176,095 B2 5/2012 Murray et al.
8,218,871 B2 7/2012 Angell et al.
8,219,660 B2 7/2012 Mccoy et al.
8,271,941 B2 9/2012 Zhang et al.
8,284,107 B2 10/2012 Borisov et al.
8,294,585 B2 10/2012 Barnhill
8,299,975 B2 10/2012 Savage et al.
8,302,020 B2 10/2012 Louch et al.
8,320,634 B2 11/2012 Deutsch
8,334,422 B2 12/2012 Gutsol et al.
8,344,893 B1 1/2013 Drammeh
8,375,118 B2 2/2013 Hao et al.
8,439,692 B1 5/2013 Oddsen et al.
8,462,060 B2 6/2013 Savage et al.
8,467,734 B2 6/2013 Schubert
8,473,080 B2 6/2013 Seem et al.

(56) References Cited

U.S. PATENT DOCUMENTS

| | | | |
|---|---|---|---|
| 8,476,590 | B2 | 7/2013 | Stratmann et al. |
| 8,516,016 | B2 | 8/2013 | Park et al. |
| 8,536,998 | B1 | 9/2013 | Siu et al. |
| 8,547,283 | B2 | 10/2013 | Wong et al. |
| 8,558,660 | B2 | 10/2013 | Nix et al. |
| 8,639,527 | B2 | 1/2014 | Rensvold et al. |
| 8,698,637 | B2 | 4/2014 | Raichman |
| 8,774,707 | B2 | 7/2014 | Flammer et al. |
| 8,816,860 | B2 | 8/2014 | Ophardt et al. |
| 8,838,413 | B2 | 9/2014 | Genta |
| 8,869,027 | B2 | 10/2014 | Louch et al. |
| 8,904,497 | B2 | 12/2014 | Hsieh |
| 8,931,337 | B2 | 1/2015 | Renoud et al. |
| 8,936,944 | B2 | 1/2015 | Peltz et al. |
| 8,947,437 | B2 | 2/2015 | Garr et al. |
| 8,950,019 | B2 | 2/2015 | Loberger et al. |
| 8,957,551 | B1 | 2/2015 | Alberth et al. |
| 8,996,188 | B2 | 3/2015 | Frader-Thompson et al. |
| 9,000,926 | B2 | 4/2015 | Hollock et al. |
| 9,002,532 | B2 | 4/2015 | Asmus |
| 9,013,283 | B1 | 4/2015 | Tackaberry |
| 9,030,325 | B2 | 5/2015 | Taneff |
| 9,098,738 | B2 | 8/2015 | Bilet et al. |
| 9,105,071 | B2 | 8/2015 | Fletcher et al. |
| 9,172,245 | B1 | 10/2015 | Lentine et al. |
| 9,175,356 | B2 | 11/2015 | Peltz et al. |
| 9,235,657 | B1 | 1/2016 | Wenzel et al. |
| 9,240,111 | B2 | 1/2016 | Scott et al. |
| 9,256,702 | B2 | 2/2016 | Elbsat et al. |
| 9,280,884 | B1 | 3/2016 | Schultz et al. |
| 9,292,972 | B2 | 3/2016 | Hailemariam et al. |
| 9,311,807 | B2 | 4/2016 | Schultz et al. |
| 9,320,662 | B2 | 4/2016 | Hayes et al. |
| 9,322,566 | B2 | 4/2016 | Wenzel et al. |
| 9,355,069 | B2 | 5/2016 | Elbsat et al. |
| 9,370,600 | B1 | 6/2016 | Dupuis et al. |
| 9,372,482 | B2 | 6/2016 | Rikkola et al. |
| 9,373,242 | B1 | 6/2016 | Conrad et al. |
| 9,396,638 | B2 | 7/2016 | Wildman et al. |
| 9,406,212 | B2 | 8/2016 | De et al. |
| 9,418,535 | B1 | 8/2016 | Felch et al. |
| 9,418,536 | B1 | 8/2016 | Felch et al. |
| 9,436,179 | B1 | 9/2016 | Turney et al. |
| 9,437,993 | B2 | 9/2016 | Stephens |
| 9,441,547 | B2 | 9/2016 | Cai et al. |
| 9,449,219 | B2 | 9/2016 | Bilet et al. |
| 9,477,543 | B2 | 10/2016 | Henley et al. |
| 9,497,832 | B2 | 11/2016 | Verberkt et al. |
| 9,513,364 | B2 | 12/2016 | Hall et al. |
| 9,526,380 | B2 | 12/2016 | Hamilton et al. |
| 9,526,806 | B2 | 12/2016 | Park et al. |
| 9,536,415 | B2 | 1/2017 | De et al. |
| 9,558,648 | B2 | 1/2017 | Douglas |
| 9,568,204 | B2 | 2/2017 | Asmus et al. |
| 9,581,985 | B2 | 2/2017 | Walser et al. |
| 9,591,267 | B2 | 3/2017 | Lipton et al. |
| 9,606,520 | B2 | 3/2017 | Noboa et al. |
| 9,612,601 | B2 | 4/2017 | Beyhaghi et al. |
| 9,613,518 | B2 | 4/2017 | Dunn et al. |
| 9,618,224 | B2 | 4/2017 | Emmons et al. |
| 9,640,059 | B2 | 5/2017 | Hyland |
| 9,672,360 | B2 | 6/2017 | Barkan |
| 9,696,054 | B2 | 7/2017 | Asmus |
| 9,699,871 | B2 | 7/2017 | Karc et al. |
| 9,710,700 | B2 | 7/2017 | Bilet et al. |
| 9,715,242 | B2 | 7/2017 | Pillai et al. |
| 9,721,452 | B2 | 8/2017 | Felch et al. |
| 9,729,945 | B2 | 8/2017 | Schultz et al. |
| 9,766,638 | B2 | 9/2017 | Georgin |
| 9,778,639 | B2 | 10/2017 | Boettcher et al. |
| 9,784,464 | B2 | 10/2017 | Yamamoto et al. |
| 9,798,336 | B2 | 10/2017 | Przybylski |
| 9,826,604 | B2 | 11/2017 | Karc et al. |
| 9,843,743 | B2 | 12/2017 | Lewis et al. |
| 9,852,481 | B1 | 12/2017 | Turney et al. |
| 9,856,634 | B2 | 1/2018 | Rodenbeck et al. |
| 9,872,088 | B2 | 1/2018 | Fadell et al. |
| 9,875,639 | B2 | 1/2018 | Bone et al. |
| 9,911,312 | B2 | 3/2018 | Wildman et al. |
| 9,940,819 | B2 | 4/2018 | Ferniany |
| 9,956,306 | B2 | 5/2018 | Brais et al. |
| 9,982,903 | B1 | 5/2018 | Ridder et al. |
| 9,986,175 | B2 | 5/2018 | Frank et al. |
| 10,007,259 | B2 | 6/2018 | Turney et al. |
| 10,031,494 | B2 | 7/2018 | Holaso |
| 10,044,101 | B1 | 8/2018 | Nair et al. |
| 10,055,114 | B2 | 8/2018 | Shah et al. |
| 10,087,608 | B2 | 10/2018 | Dobizl et al. |
| 10,101,730 | B2 | 10/2018 | Wenzel et al. |
| 10,101,731 | B2 | 10/2018 | Asmus et al. |
| 10,112,727 | B1 | 10/2018 | Cutler |
| 10,175,681 | B2 | 1/2019 | Wenzel et al. |
| 10,222,083 | B2 | 3/2019 | Drees et al. |
| 10,222,767 | B2 | 3/2019 | Holaso et al. |
| 10,223,894 | B2 | 3/2019 | Raichman |
| 10,228,837 | B2 | 3/2019 | Hua et al. |
| 10,235,865 | B2 | 3/2019 | Thyroff |
| 10,251,610 | B2 | 4/2019 | Parthasarathy et al. |
| 10,282,796 | B2 | 5/2019 | Elbsat et al. |
| 10,288,306 | B2 | 5/2019 | Ridder et al. |
| 10,303,843 | B2 | 5/2019 | Bitran et al. |
| 10,317,864 | B2 | 6/2019 | Boettcher et al. |
| 10,332,043 | B2 | 6/2019 | Nair et al. |
| 10,332,382 | B2 | 6/2019 | Thyroff |
| 10,359,748 | B2 | 7/2019 | Elbsat et al. |
| 10,386,820 | B2 | 8/2019 | Wenzel et al. |
| 10,402,767 | B2 | 9/2019 | Noboa et al. |
| 10,514,178 | B2 | 12/2019 | Willmott et al. |
| 10,514,817 | B2 | 12/2019 | Hua et al. |
| 10,520,210 | B2 | 12/2019 | Park et al. |
| 10,544,955 | B2 | 1/2020 | Przybylski |
| 10,558,178 | B2 | 2/2020 | Willmott et al. |
| 10,559,180 | B2 | 2/2020 | Pourmohammad et al. |
| 10,559,181 | B2 | 2/2020 | Pourmohammad et al. |
| 10,565,844 | B2 | 2/2020 | Pourmohammad et al. |
| 10,600,263 | B2 | 3/2020 | Park et al. |
| 10,602,474 | B2 | 3/2020 | Goldstein |
| 10,605,477 | B2 | 3/2020 | Ridder |
| 10,607,147 | B2 | 3/2020 | Raykov et al. |
| 10,615,635 | B1 | 4/2020 | Desantis et al. |
| 10,619,882 | B2 | 4/2020 | Chatterjee et al. |
| 10,627,124 | B2 | 4/2020 | Walser et al. |
| 10,673,380 | B2 | 6/2020 | Wenzel et al. |
| 10,678,227 | B2 | 6/2020 | Przybylski et al. |
| 10,694,610 | B2 | 6/2020 | Karc et al. |
| 10,706,375 | B2 | 7/2020 | Wenzel et al. |
| 10,726,711 | B2 | 7/2020 | Subramanian et al. |
| 10,732,584 | B2 | 8/2020 | Elbsat et al. |
| 10,767,885 | B2 | 9/2020 | Przybylski et al. |
| 10,775,988 | B2 | 9/2020 | Narain et al. |
| 10,796,554 | B2 | 10/2020 | Vincent et al. |
| 10,809,682 | B2 | 10/2020 | Patil et al. |
| 10,809,705 | B2 | 10/2020 | Przybylski |
| 10,824,125 | B2 | 11/2020 | Elbsat et al. |
| 10,854,194 | B2 | 12/2020 | Park et al. |
| 10,871,298 | B2 | 12/2020 | Ridder et al. |
| 10,876,754 | B2 | 12/2020 | Wenzel et al. |
| 10,890,904 | B2 | 1/2021 | Turney et al. |
| 10,900,686 | B2 | 1/2021 | Willmott et al. |
| 10,901,446 | B2 | 1/2021 | Nesler et al. |
| 10,909,240 | B2 | 2/2021 | Eltoft |
| 10,909,642 | B2 | 2/2021 | Elbsat et al. |
| 10,915,094 | B2 | 2/2021 | Wenzel et al. |
| 10,917,740 | B1 | 2/2021 | Scott et al. |
| 10,921,972 | B2 | 2/2021 | Park et al. |
| 10,921,973 | B2 | 2/2021 | Park et al. |
| 10,923,911 | B2 | 2/2021 | Raneri et al. |
| 10,928,790 | B2 | 2/2021 | Mueller et al. |
| 10,948,884 | B2 | 3/2021 | Beaty et al. |
| 10,949,777 | B2 | 3/2021 | Elbsat et al. |
| 10,955,800 | B2 | 3/2021 | Burroughs et al. |
| 10,956,842 | B2 | 3/2021 | Wenzel et al. |
| 10,962,945 | B2 | 3/2021 | Park et al. |
| 10,969,135 | B2 | 4/2021 | Willmott et al. |

(56) References Cited

U.S. PATENT DOCUMENTS

| | | | |
|---|---|---|---|
| 11,002,457 | B2 | 5/2021 | Turney et al. |
| 11,009,252 | B2 | 5/2021 | Turney et al. |
| 11,010,846 | B2 | 5/2021 | Elbsat et al. |
| 11,016,648 | B2 | 5/2021 | Fala et al. |
| 11,016,998 | B2 | 5/2021 | Park et al. |
| 11,022,947 | B2 | 6/2021 | Elbsat et al. |
| 11,024,292 | B2 | 6/2021 | Park et al. |
| 11,036,249 | B2 | 6/2021 | Elbsat |
| 11,038,709 | B2 | 6/2021 | Park et al. |
| 11,042,139 | B2 | 6/2021 | Deshpande et al. |
| 11,042,924 | B2 | 6/2021 | Asmus et al. |
| 11,061,424 | B2 | 7/2021 | Elbsat et al. |
| 11,068,821 | B2 | 7/2021 | Wenzel et al. |
| 11,070,389 | B2 | 7/2021 | Schuster et al. |
| 11,073,976 | B2 | 7/2021 | Park et al. |
| 11,080,289 | B2 | 8/2021 | Park et al. |
| 11,080,426 | B2 | 8/2021 | Park et al. |
| 11,083,072 | B2 | 8/2021 | Karc et al. |
| 11,086,276 | B2 | 8/2021 | Wenzel et al. |
| 11,094,186 | B2 | 8/2021 | Razak |
| 11,108,587 | B2 | 8/2021 | Park et al. |
| 11,113,295 | B2 | 9/2021 | Park et al. |
| 11,119,458 | B2 | 9/2021 | Asp et al. |
| 11,120,012 | B2 | 9/2021 | Park et al. |
| 11,131,473 | B2 | 9/2021 | Risbeck et al. |
| 11,150,617 | B2 | 10/2021 | Ploegert et al. |
| 11,151,983 | B2 | 10/2021 | Park et al. |
| 11,156,996 | B2 | 10/2021 | Schuster et al. |
| 11,158,306 | B2 | 10/2021 | Park et al. |
| 11,182,047 | B2 | 11/2021 | Nayak et al. |
| 11,195,401 | B2 | 12/2021 | Pourmohammad |
| 11,201,395 | B2 | 12/2021 | Carpenter et al. |
| 11,217,087 | B2 | 1/2022 | Pelski |
| 11,226,126 | B2 | 1/2022 | Przybylski et al. |
| 11,243,523 | B2 | 2/2022 | Llopis et al. |
| 11,268,715 | B2 | 3/2022 | Park et al. |
| 11,268,996 | B2 | 3/2022 | Vitullo et al. |
| 11,269,505 | B2 | 3/2022 | Fala et al. |
| 11,272,011 | B1 | 3/2022 | Laughton et al. |
| 11,272,316 | B2 | 3/2022 | Scott et al. |
| 11,275,348 | B2 | 3/2022 | Park et al. |
| 11,275,363 | B2 | 3/2022 | Przybylski et al. |
| 11,281,169 | B2 | 3/2022 | Chatterjee et al. |
| 11,288,754 | B2 | 3/2022 | Elbsat et al. |
| 11,289,853 | B2 | 3/2022 | Stephens |
| 11,314,726 | B2 | 4/2022 | Park et al. |
| 11,314,788 | B2 | 4/2022 | Park et al. |
| 11,334,044 | B2 | 5/2022 | Goyal |
| 11,353,834 | B2 | 6/2022 | Mueller et al. |
| 11,356,292 | B2 | 6/2022 | Ploegert et al. |
| 11,360,451 | B2 | 6/2022 | Pancholi et al. |
| 11,361,123 | B2 | 6/2022 | Ploegert et al. |
| 11,450,969 | B1 | 9/2022 | Hussain |
| 11,569,621 | B2 | 1/2023 | Turner et al. |
| 11,588,245 | B2 | 2/2023 | Wei |
| 11,614,721 | B2 | 3/2023 | Funes |
| 11,888,093 | B2 | 1/2024 | Zhang et al. |
| 11,946,960 | B2 | 4/2024 | Della et al. |
| 12,072,357 | B1 | 8/2024 | Chaboud et al. |
| 2002/0111698 | A1 | 8/2002 | Graziano et al. |
| 2002/0130868 | A1 | 9/2002 | Smith |
| 2002/0175815 | A1 | 11/2002 | Baldwin |
| 2003/0028269 | A1 | 2/2003 | Spriggs et al. |
| 2003/0030637 | A1 | 2/2003 | Grinstein et al. |
| 2003/0046862 | A1 | 3/2003 | Wolf et al. |
| 2003/0071814 | A1 | 4/2003 | Jou et al. |
| 2003/0078677 | A1 | 4/2003 | Hull et al. |
| 2003/0083957 | A1 | 5/2003 | Olefson |
| 2003/0103075 | A1 | 6/2003 | Rosselot |
| 2003/0171851 | A1 | 9/2003 | Brickfield et al. |
| 2003/0179149 | A1 | 9/2003 | Savage et al. |
| 2003/0214400 | A1 | 11/2003 | Mizutani et al. |
| 2003/0233432 | A1 | 12/2003 | Davis et al. |
| 2004/0001009 | A1 | 1/2004 | Winings et al. |
| 2004/0030531 | A1 | 2/2004 | Miller et al. |
| 2004/0041734 | A1 | 3/2004 | Shiotsu et al. |
| 2004/0064260 | A1 | 4/2004 | Padmanabhan et al. |
| 2004/0143474 | A1 | 7/2004 | Haeberle et al. |
| 2004/0153437 | A1 | 8/2004 | Buchan |
| 2004/0168115 | A1 | 8/2004 | Bauernschmidt et al. |
| 2004/0196188 | A1 | 10/2004 | Yeh |
| 2004/0233192 | A1 | 11/2004 | Hopper |
| 2004/0260411 | A1 | 12/2004 | Cannon |
| 2005/0007279 | A1 | 1/2005 | Chang |
| 2005/0010460 | A1 | 1/2005 | Mizoguchi et al. |
| 2005/0060107 | A1 | 3/2005 | Rodenberg et al. |
| 2005/0083235 | A1 | 4/2005 | Savage et al. |
| 2005/0110692 | A1 | 5/2005 | Andersson |
| 2005/0119767 | A1 | 6/2005 | Kiwimagi et al. |
| 2005/0143863 | A1 | 6/2005 | Ruane et al. |
| 2005/0190074 | A1 | 9/2005 | Cumeralto et al. |
| 2005/0200554 | A1 | 9/2005 | Chau |
| 2005/0267900 | A1 | 12/2005 | Ahmed et al. |
| 2006/0004841 | A1 | 1/2006 | Heikkonen et al. |
| 2006/0009862 | A1 | 1/2006 | Imhof et al. |
| 2006/0016201 | A1 | 1/2006 | Kopel |
| 2006/0017547 | A1 | 1/2006 | Buckingham et al. |
| 2006/0020177 | A1 | 1/2006 | Seo et al. |
| 2006/0028471 | A1 | 2/2006 | Kincaid et al. |
| 2006/0029256 | A1 | 2/2006 | Miyoshi et al. |
| 2006/0055610 | A1 | 3/2006 | Borisov et al. |
| 2006/0058900 | A1 | 3/2006 | Johanson et al. |
| 2006/0067545 | A1 | 3/2006 | Lewis et al. |
| 2006/0067546 | A1 | 3/2006 | Lewis et al. |
| 2006/0077255 | A1 | 4/2006 | Cheng |
| 2006/0114121 | A1 | 6/2006 | Cumeralto et al. |
| 2006/0161373 | A1 | 7/2006 | Mangrulkar et al. |
| 2006/0184326 | A1 | 8/2006 | Mcnally et al. |
| 2006/0231568 | A1 | 10/2006 | Lynn et al. |
| 2006/0265664 | A1 | 11/2006 | Simons et al. |
| 2006/0279630 | A1 | 12/2006 | Aggarwal et al. |
| 2006/0284784 | A1 | 12/2006 | Smith et al. |
| 2007/0016955 | A1 | 1/2007 | Goldberg et al. |
| 2007/0055757 | A1 | 3/2007 | Mairs et al. |
| 2007/0055760 | A1 | 3/2007 | Mccoy et al. |
| 2007/0061046 | A1 | 3/2007 | Mairs et al. |
| 2007/0063915 | A1 | 3/2007 | Savage et al. |
| 2007/0067062 | A1 | 3/2007 | Mairs et al. |
| 2007/0088534 | A1 | 4/2007 | Macarthur et al. |
| 2007/0090951 | A1 | 4/2007 | Chan et al. |
| 2007/0091091 | A1 | 4/2007 | Gardiner et al. |
| 2007/0101433 | A1 | 5/2007 | Louch et al. |
| 2007/0114295 | A1 | 5/2007 | Jenkins |
| 2007/0118270 | A1 | 5/2007 | Wiseman et al. |
| 2007/0120652 | A1 | 5/2007 | Behnke |
| 2007/0121512 | A1 | 5/2007 | Schibli et al. |
| 2007/0139208 | A1 | 6/2007 | Kates |
| 2007/0188388 | A1 | 8/2007 | Feng et al. |
| 2007/0216682 | A1 | 9/2007 | Navratil et al. |
| 2007/0219645 | A1 | 9/2007 | Thomas et al. |
| 2007/0229366 | A1 | 10/2007 | Kim et al. |
| 2007/0239484 | A1 | 10/2007 | Arond et al. |
| 2007/0241968 | A1 * | 10/2007 | Shih ........................ H01Q 9/42 343/846 |
| 2007/0268122 | A1 | 11/2007 | Kow et al. |
| 2007/0271006 | A1 | 11/2007 | Golden et al. |
| 2008/0001763 | A1 | 1/2008 | Raja et al. |
| 2008/0009177 | A1 | 1/2008 | Singer et al. |
| 2008/0011864 | A1 | 1/2008 | Tessier et al. |
| 2008/0027885 | A1 | 1/2008 | Van et al. |
| 2008/0036593 | A1 | 2/2008 | Rose-Pehrsson et al. |
| 2008/0062167 | A1 | 3/2008 | Boggs et al. |
| 2008/0099045 | A1 | 5/2008 | Glenn et al. |
| 2008/0103798 | A1 | 5/2008 | Domenikos et al. |
| 2008/0120396 | A1 | 5/2008 | Jayaram et al. |
| 2008/0129536 | A1 | 6/2008 | Randall et al. |
| 2008/0144885 | A1 | 6/2008 | Zucherman et al. |
| 2008/0173629 | A1 | 7/2008 | Deibel et al. |
| 2008/0180330 | A1 | 7/2008 | Wei-Shan et al. |
| 2008/0183424 | A1 | 7/2008 | Seem |
| 2008/0194009 | A1 | 8/2008 | Marentis |
| 2008/0198231 | A1 | 8/2008 | Ozdemir et al. |
| 2008/0209342 | A1 | 8/2008 | Taylor et al. |
| 2008/0222565 | A1 | 9/2008 | Taylor et al. |

(56) References Cited

U.S. PATENT DOCUMENTS

2008/0224862 A1 9/2008 Cirker
2008/0228325 A1 9/2008 Schindler
2008/0238406 A1 10/2008 Banhegyesi
2008/0238711 A1 10/2008 Payne et al.
2008/0242945 A1 10/2008 Gugliotti et al.
2008/0250800 A1 10/2008 Wetzel
2008/0279420 A1 11/2008 Masticola et al.
2008/0280275 A1 11/2008 Collopy
2008/0303658 A1 12/2008 Melker et al.
2008/0306985 A1 12/2008 Murray et al.
2008/0316087 A1 12/2008 Stoufer et al.
2008/0320552 A1 12/2008 Kumar et al.
2009/0001180 A1 1/2009 Siddaramanna et al.
2009/0001181 A1 1/2009 Siddaramanna et al.
2009/0001182 A1 1/2009 Siddaramanna et al.
2009/0015356 A1 1/2009 Chen
2009/0024944 A1 1/2009 Louch et al.
2009/0045804 A1 2/2009 Durling et al.
2009/0065596 A1 3/2009 Seem et al.
2009/0083120 A1 3/2009 Strichman et al.
2009/0096791 A1 4/2009 Abshear et al.
2009/0125337 A1 5/2009 Abri
2009/0125825 A1 5/2009 Rye et al.
2009/0144023 A1 6/2009 Seem
2009/0157744 A1 6/2009 Mcconnell
2009/0160673 A1 6/2009 Cirker
2009/0195349 A1 8/2009 Frader-Thompson et al.
2009/0224987 A1 9/2009 Maddaleno
2009/0312969 A1 12/2009 Sundaresh et al.
2009/0315409 A1 12/2009 Wheeler et al.
2009/0322782 A1 12/2009 Kimchi et al.
2010/0038218 A1 2/2010 Fisher et al.
2010/0048167 A1 2/2010 Chow et al.
2010/0058248 A1 3/2010 Park
2010/0064001 A1 3/2010 Daily
2010/0070089 A1 3/2010 Harrod et al.
2010/0073162 A1 3/2010 Johnson et al.
2010/0097287 A1 4/2010 Pakosz et al.
2010/0110617 A1 5/2010 Savage et al.
2010/0123421 A1 5/2010 Grabinger et al.
2010/0123560 A1 5/2010 Nix et al.
2010/0134296 A1 6/2010 Hwang
2010/0149053 A1 6/2010 Nakano et al.
2010/0156628 A1 6/2010 Ainsbury et al.
2010/0156630 A1 6/2010 Ainsbury
2010/0188228 A1 7/2010 Hyland
2010/0201514 A1 8/2010 Barna et al.
2010/0223198 A1 9/2010 Noureldin et al.
2010/0249955 A1 9/2010 Sitton
2010/0253538 A1 10/2010 Smith
2010/0280674 A1 11/2010 Jalili
2010/0286937 A1 11/2010 Hedley et al.
2010/0318200 A1 12/2010 Foslien et al.
2010/0324962 A1 12/2010 Nesler et al.
2011/0010654 A1 1/2011 Raymond et al.
2011/0038104 A1 2/2011 Payne et al.
2011/0057799 A1 3/2011 Taneff
2011/0063172 A1 3/2011 Podduturi
2011/0076131 A1 3/2011 Stabley et al.
2011/0077779 A1 3/2011 Fuller et al.
2011/0083094 A1 4/2011 Laycock et al.
2011/0087988 A1 4/2011 Ray et al.
2011/0095608 A1 4/2011 Jonsson et al.
2011/0095949 A1 4/2011 Wong et al.
2011/0112854 A1 5/2011 Koch et al.
2011/0122027 A1 5/2011 Wong et al.
2011/0126111 A1 5/2011 Gill et al.
2011/0149544 A1 6/2011 Khan
2011/0154426 A1 6/2011 Doser et al.
2011/0161124 A1 6/2011 Lappinga et al.
2011/0163925 A1 7/2011 Savage et al.
2011/0169646 A1 7/2011 Raichman
2011/0184563 A1 7/2011 Foslien et al.
2011/0196634 A1 8/2011 Kemp et al.
2011/0202467 A1 8/2011 Hilber et al.
2011/0227806 A1 9/2011 Wong et al.
2011/0242863 A1 10/2011 Park et al.
2011/0260938 A1 10/2011 Xie
2011/0267237 A1 11/2011 Wong et al.
2011/0273298 A1 11/2011 Snodgrass et al.
2011/0291841 A1 12/2011 Hollock et al.
2011/0298301 A1 12/2011 Wong et al.
2011/0302433 A1 12/2011 Liu
2011/0316703 A1 12/2011 Butler et al.
2011/0320054 A1 12/2011 Brzezowski
2012/0001815 A1 1/2012 Wong et al.
2012/0015665 A1 1/2012 Farley et al.
2012/0022700 A1 1/2012 Drees et al.
2012/0039503 A1 2/2012 Chen et al.
2012/0062382 A1 3/2012 Taneff
2012/0075464 A1 3/2012 Derenne et al.
2012/0098710 A1 4/2012 Seal et al.
2012/0109988 A1 5/2012 Li et al.
2012/0112883 A1 5/2012 Wallace et al.
2012/0131217 A1 5/2012 Delorme et al.
2012/0154222 A1 6/2012 Oh et al.
2012/0158185 A1 6/2012 El-Mankabady et al.
2012/0216243 A1 8/2012 Gill et al.
2012/0224057 A1 9/2012 Gill et al.
2012/0259466 A1 10/2012 Ray et al.
2012/0262472 A1 10/2012 Garr et al.
2012/0272146 A1 10/2012 D'Souza et al.
2012/0290261 A1 11/2012 Genta
2012/0291068 A1 11/2012 Khushoo et al.
2012/0303652 A1 11/2012 Tseng
2012/0310418 A1 12/2012 Harrod et al.
2013/0050033 A1 2/2013 Savage et al.
2013/0055132 A1 2/2013 Foslien
2013/0060794 A1 3/2013 Puttabasappa et al.
2013/0082842 A1 4/2013 Balazs et al.
2013/0085620 A1 4/2013 Lu et al.
2013/0086152 A1 4/2013 Hersche et al.
2013/0091631 A1 4/2013 Hayes et al.
2013/0091945 A1 4/2013 Renoud et al.
2013/0099938 A1 4/2013 Borisov et al.
2013/0110295 A1 5/2013 Zheng et al.
2013/0135468 A1 5/2013 Kim et al.
2013/0148248 A1 6/2013 Zhou
2013/0157559 A1 6/2013 Flammer et al.
2013/0164971 A1 6/2013 Chung et al.
2013/0169681 A1 7/2013 Rasane et al.
2013/0178996 A1 7/2013 Li et al.
2013/0184880 A1 7/2013 Mcmahon
2013/0187775 A1 7/2013 Marsden et al.
2013/0204570 A1 8/2013 Mendelson et al.
2013/0229276 A1 9/2013 Hunter
2013/0234534 A1 9/2013 Lin
2013/0268293 A1 10/2013 Knudson et al.
2013/0289774 A1 10/2013 Day et al.
2014/0032157 A1 1/2014 Khiani
2014/0035368 A1 2/2014 Adams
2014/0040998 A1 2/2014 Yi-Chang
2014/0046490 A1 2/2014 Foslien et al.
2014/0046722 A1 2/2014 Rosenbloom et al.
2014/0058539 A1 2/2014 Park
2014/0077821 A1 3/2014 Reed et al.
2014/0088779 A1 3/2014 Chen et al.
2014/0167917 A2 6/2014 Wallace et al.
2014/0180486 A1 6/2014 Newman et al.
2014/0184453 A1 7/2014 Chen et al.
2014/0207291 A1 7/2014 Golden et al.
2014/0265881 A1 9/2014 Karc et al.
2014/0274181 A1 9/2014 Lovegren et al.
2014/0277764 A1 9/2014 Burt
2014/0292518 A1 10/2014 Wildman et al.
2014/0307076 A1 10/2014 Deutsch
2014/0309757 A1 10/2014 Le et al.
2014/0312696 A1 10/2014 Tousignant et al.
2014/0316582 A1 10/2014 Berg-Sonne et al.
2014/0320289 A1 10/2014 Raichman
2014/0342724 A1 11/2014 Hill et al.
2015/0007713 A1 1/2015 Aki
2015/0025329 A1 1/2015 Amarasingham et al.
2015/0032264 A1 1/2015 Emmons et al.

(56) References Cited

U.S. PATENT DOCUMENTS

2015/0035712 A1 2/2015 Wong et al.
2015/0056909 A1 2/2015 Chien
2015/0070174 A1 3/2015 Douglas
2015/0077258 A1 3/2015 Nelson et al.
2015/0113462 A1 4/2015 Chen et al.
2015/0123874 A1 5/2015 Chan et al.
2015/0153918 A1 6/2015 Chen et al.
2015/0161874 A1 6/2015 Thyroff et al.
2015/0167995 A1 6/2015 Fadell et al.
2015/0168949 A1 6/2015 Hua et al.
2015/0194043 A1 7/2015 Dunn et al.
2015/0198707 A1 7/2015 Al-Alusi
2015/0212717 A1 7/2015 Nair et al.
2015/0213222 A1 7/2015 Amarasingham et al.
2015/0213379 A1 7/2015 Nair et al.
2015/0216369 A1 8/2015 Hamilton et al.
2015/0236417 A1 8/2015 Iellci
2015/0249337 A1 9/2015 Raneri et al.
2015/0253748 A1 9/2015 Brun et al.
2015/0262468 A1 9/2015 Yang
2015/0281287 A1 10/2015 Gill et al.
2015/0289125 A1 10/2015 Van et al.
2015/0323928 A1 11/2015 Yim et al.
2015/0358874 A1 12/2015 Ahn et al.
2015/0380932 A1 12/2015 Karle
2016/0061476 A1 3/2016 Schultz et al.
2016/0061477 A1 3/2016 Schultz et al.
2016/0061794 A1 3/2016 Schultz et al.
2016/0061795 A1 3/2016 Schultz et al.
2016/0063833 A1 3/2016 Schultz et al.
2016/0066067 A1 3/2016 Schultz et al.
2016/0116181 A1 4/2016 Aultman et al.
2016/0139067 A1 5/2016 Grace
2016/0195435 A1 7/2016 Krueger et al.
2016/0197467 A1 7/2016 Stepp
2016/0223215 A1 8/2016 Buda et al.
2016/0253897 A1 9/2016 Wildman et al.
2016/0255516 A1 9/2016 Hill et al.
2016/0266183 A1 9/2016 Park
2016/0268742 A1 9/2016 Seff et al.
2016/0294048 A1 10/2016 Xu et al.
2016/0294062 A1 10/2016 Lo et al.
2016/0298864 A1 10/2016 Ekolind et al.
2016/0306934 A1 10/2016 Sperry et al.
2016/0314683 A1 10/2016 Felch et al.
2016/0328948 A1 11/2016 Ferniany
2016/0335731 A1 11/2016 Hall
2016/0367925 A1 12/2016 Blackley
2016/0380392 A1 12/2016 Justice et al.
2017/0024986 A1 1/2017 Austin
2017/0152862 A1 6/2017 Houst et al.
2017/0193792 A1 7/2017 Bermudez et al.
2017/0207542 A1 7/2017 Tseng et al.
2017/0256155 A1 9/2017 Sengstaken, Jr.
2017/0280949 A1 10/2017 Wildman et al.
2017/0293293 A1 10/2017 Brownie et al.
2017/0294106 A1 10/2017 Thyroff
2017/0310109 A1 10/2017 Bollinger et al.
2017/0365024 A1 12/2017 Koch et al.
2018/0006492 A1 1/2018 Kim et al.
2018/0016773 A1 1/2018 Chandler et al.
2018/0076527 A1 3/2018 Chen et al.
2018/0151054 A1 5/2018 Pi
2018/0193501 A1 7/2018 Ufkes
2018/0218591 A1 8/2018 Easter
2018/0226797 A1 8/2018 Galin et al.
2018/0259927 A1 9/2018 Przybylski et al.
2018/0293038 A1 10/2018 Meruva et al.
2018/0294570 A1 10/2018 Stowell
2018/0301014 A1 10/2018 Worral et al.
2018/0313695 A1 11/2018 Shim et al.
2018/0364778 A1 12/2018 Lee
2018/0365957 A1 12/2018 Wright et al.
2019/0051138 A1 2/2019 Easter
2019/0067883 A1 2/2019 Yilmaz et al.
2019/0139395 A1 5/2019 Rogachev et al.
2019/0157817 A1 5/2019 Codreanu
2019/0209719 A1 7/2019 Andersen et al.
2020/0009280 A1 1/2020 Kupa et al.
2020/0021019 A1 1/2020 Rajagopalan et al.
2020/0021021 A1 1/2020 Lin et al.
2020/0074836 A1 3/2020 Kolavennu et al.
2020/0076067 A1 3/2020 Mccraven
2020/0090089 A1 3/2020 Aston et al.
2020/0136374 A1 4/2020 Hagerman
2020/0146557 A1 5/2020 Cheung et al.
2020/0168993 A1 5/2020 Wei
2020/0179544 A1 6/2020 Ufkes
2020/0200420 A1 6/2020 Nayak et al.
2020/0208862 A1 7/2020 Mikulica et al.
2020/0343675 A1 10/2020 Wolf et al.
2020/0359605 A1 11/2020 Maher et al.
2021/0010701 A1 1/2021 Nesler et al.
2021/0011443 A1 1/2021 Mcnamara et al.
2021/0011444 A1 1/2021 Risbeck et al.
2021/0018334 A1 1/2021 Liu et al.
2021/0018884 A1 1/2021 Kupa et al.
2021/0022194 A1 1/2021 Taylor et al.
2021/0046205 A1 2/2021 Copeland et al.
2021/0057205 A1 2/2021 Riepe et al.
2021/0081845 A1 3/2021 Choueiter et al.
2021/0157303 A1 5/2021 Doh et al.
2021/0173046 A1 6/2021 Regani et al.
2021/0184409 A1 6/2021 Li et al.
2021/0223769 A1 7/2021 Khalate et al.
2021/0345065 A1 11/2021 Fisher et al.
2021/0359413 A1 11/2021 Sarabandi et al.
2021/0364181 A1 11/2021 Risbeck et al.
2021/0373519 A1 12/2021 Risbeck et al.
2022/0011731 A1 1/2022 Risbeck et al.
2022/0104123 A1 3/2022 Heeger et al.
2022/0113045 A1 4/2022 Gamroth et al.
2022/0137580 A1 5/2022 Burroughs et al.
2022/0149571 A1 5/2022 Codreanu et al.
2022/0303167 A1 9/2022 Wang et al.
2022/0352670 A1 11/2022 East
2023/0039166 A1 2/2023 Chapel et al.
2023/0261370 A1 8/2023 Hu et al.
2023/0299506 A1 9/2023 Park et al.
2023/0318222 A1 10/2023 Ko
2023/0402842 A1 12/2023 Macfie et al.
2024/0063658 A1 2/2024 Williams et al.
2024/0146061 A1 5/2024 Das et al.
2024/0167720 A1 5/2024 Luebke
2024/0258693 A1 8/2024 Liu et al.
2024/0283152 A1 8/2024 Wei et al.
2024/0283288 A1 8/2024 Feixas
2024/0313408 A1 9/2024 Hussain et al.

FOREIGN PATENT DOCUMENTS

CA 2821190 A1 1/2014
CN 2906952 Y 5/2007
CN 201927858 U 8/2011
CN 201985387 U 9/2011
CN 102891410 A 1/2013
CN 103110410 A 5/2013
CN 103197138 A 7/2013
CN 103259136 A 8/2013
CN 103401103 A 11/2013
CN 203398457 U 1/2014
CN 203707489 U 7/2014
CN 103970977 A 8/2014
CN 104280243 A 1/2015
CN 104601682 A 5/2015
CN 105116848 A 12/2015
CN 105186227 A 12/2015
CN 105527850 A 4/2016
CN 106299896 A 1/2017
CN 106450871 A 2/2017
CN 107168087 A 9/2017
CN 108075324 A 5/2018
CN 207572679 U 7/2018
CN 108961714 A 12/2018

(56) References Cited

FOREIGN PATENT DOCUMENTS

| | | | |
|---|---|---|---|
| CN | 108987919 | A | 12/2018 |
| CN | 109039840 | A | 12/2018 |
| CN | 109656208 | A | 4/2019 |
| CN | 110009245 | A | 7/2019 |
| CN | 110014930 | A | 7/2019 |
| CN | 110084928 | A | 8/2019 |
| CN | 209448741 | U | 9/2019 |
| CN | 110516788 | A | 11/2019 |
| CN | 210006913 | U | 1/2020 |
| CN | 110768840 | A | 2/2020 |
| CN | 110827457 | A | 2/2020 |
| CN | 110994604 | A | 4/2020 |
| CN | 111649449 | A | 9/2020 |
| CN | 112310753 | A | 2/2021 |
| CN | 213936532 | U | 8/2021 |
| CN | 113381184 | A | 9/2021 |
| CN | 113709839 | A | 11/2021 |
| CN | 114723040 | A | 7/2022 |
| CN | 115296029 | A | 11/2022 |
| CN | 115051151 | B | 4/2024 |
| CN | 113285218 | B | 3/2025 |
| EP | 1669912 | A1 | 6/2006 |
| EP | 2310981 | A1 | 4/2011 |
| EP | 2688144 | A1 | 1/2014 |
| GB | 2478762 | A | 9/2011 |
| GB | 2504967 | A | 2/2014 |
| GB | 2599142 | A | 3/2022 |
| JP | 07-085166 | A | 3/1995 |
| JP | 11-024735 | A | 1/1999 |
| JP | 11-317936 | A | 11/1999 |
| JP | 2001-356813 | A | 12/2001 |
| JP | 2005-242531 | A | 9/2005 |
| JP | 2005-311563 | A | 11/2005 |
| JP | 2012-253865 | A | 12/2012 |
| JP | 2013-004394 | A | 1/2013 |
| JP | 5416066 | B2 | 2/2014 |
| JP | 2018-132318 | A | 8/2018 |
| JP | 7085166 | B2 | 6/2022 |
| KR | 10-2008-0002346 | A | 1/2008 |
| KR | 10-1172747 | B1 | 8/2012 |
| KR | 10-1445367 | B1 | 10/2014 |
| KR | 10-1499081 | B1 | 3/2015 |
| KR | 10-2016-0063666 | A | 6/2016 |
| KR | 10-2017-0113492 | A | 10/2017 |
| KR | 10-2216687 | B1 | 2/2021 |
| KR | 10-2021-0089867 | A | 7/2021 |
| WO | 96/21264 | A2 | 7/1996 |
| WO | 2004/029518 | A1 | 4/2004 |
| WO | 2005/022457 | A1 | 3/2005 |
| WO | 2005/045715 | A2 | 5/2005 |
| WO | 2008/152433 | A1 | 12/2008 |
| WO | 2008/157755 | A1 | 12/2008 |
| WO | 2009/012319 | A2 | 1/2009 |
| WO | 2009/079648 | A1 | 6/2009 |
| WO | 2010/004514 | A1 | 1/2010 |
| WO | 2010/106474 | A1 | 9/2010 |
| WO | 2011/025085 | A1 | 3/2011 |
| WO | 2011/043732 | A1 | 4/2011 |
| WO | 2011/057173 | A2 | 5/2011 |
| WO | 2011/123743 | A1 | 10/2011 |
| WO | 2013/062725 | A1 | 5/2013 |
| WO | 2013/178819 | A1 | 12/2013 |
| WO | 2014/009291 | A1 | 1/2014 |
| WO | 2014/098861 | A1 | 6/2014 |
| WO | 2014/135517 | A1 | 9/2014 |
| WO | 2016/113779 | A1 | 7/2016 |
| WO | 2016/123536 | A1 | 8/2016 |
| WO | 2017/057274 | A1 | 4/2017 |
| WO | 2018/222695 | A1 | 12/2018 |
| WO | 2019/046580 | A1 | 3/2019 |
| WO | 2019/141629 | A1 | 7/2019 |
| WO | 2020/016570 | A1 | 1/2020 |
| WO | 2020/024553 | A1 | 2/2020 |
| WO | 2020/093979 | A1 | 5/2020 |
| WO | 2024/087131 | A1 | 5/2024 |
| WO | 2024/087134 | A1 | 5/2024 |

OTHER PUBLICATIONS

Lucid Design Group, Inc., "Building Dashboard," 2 pages, Printed May 30, 2013.
Lui et al., "Compact Dual-Frequency PIFA Designs Using LC Resonators," IEEE Transactions on Antennas and Propagation, vol. 49, No. 7, 4 pages, Jul. 2001.
Mathew, "Action-Oriented Benchmarking, Using CEUS Date to Identify and Prioritize Efficiency Opportunities in California Commercial Buildings," 26 pages, Jun. 2007.
Morrison et al., "The Early Event Detection Toolkit," Honeywell Process Solutions, 14 pages, Jan. 2006.
Narang, "WEBARC: Control and Monitoring of Building Systems Over the Web," 53 pages, May 1999.
Oey et al., "Evaluation of Isolation Compliance Using Real Time Video In Critical Care," North Shore University Hospital, 1 page, Oct. 9, 2015.
Olken et al., "Object Lessons Learned from a Distributed System for Remote Building Monitoring and Operation," ACM SIGPLAN Notices, vol. 33, No. 10, pp. 284-295, Oct. 1998.
Open Blue Companion Desktop User Guide, Johnson Controls, 18 pages, 2022.
Open Blue Digital Twin: Designed for Buildings. Infused with AI, Johnson Controls, 17 pages, 2022. Accessed Aug. 29, 2022.
Open Blue Enterprise Manager User Guide, Johnson Controls, 108 pages, Release 4.1.3, 2022, Accessed Aug. 29, 2022.
Open Blue Enterprise Manager User Guide, Johnson Controls, Release 3.1, 72 pages, Jan. 28, 2021.
Open Blue Enterprise Manager User Guide, Johnson Controls, Release 4.0, 78pages, Nov. 29, 2021.
Open Blue Enterprise Manager, Optimize Building Portfolio Performance with Advanced Data Analystics and AI, Johnson Controls, 20 pages, Accessed Aug. 29, 2022.
Open Blue Location Manager User Guide, Johnson Controls, Release 2.4.7, 28 pages, Jul. 20, 2022.
Open Blue Platform, Make Smarter, Faster, More Data-Driven Decisions, Johnson Controls, 15 pages, 2022. Accessed Aug. 29, 2022.
Open Blue, Now, Spaces have Memory and Identity, Johnson Controls, 20 pages, 2022. Accessed Feb. 10, 2022.
Panduit Corp., "Enable a Building Automation with Panduit Enterprise Solutions," 4 pages, Nov. 2012.
Patents Act 1977: Combined Search and Examination Report under Sections 17 and 18(3), GB Application No. GB2316283.7, GB Intellectual Property Office, Apr. 17, 2024 (9 pages).
Patents Act 1977: Combined Search and Examination Report under Sections 17 and 18(3), UK Intellectual Property Office, Application No. GB2314939.6, Oct. 28, 2024 (7 pages).
Patents Act 1977: Search Report under Section 17, Application No. GB2316189.6, GB Intellectual Property Office, Apr. 2, 2024 (4 pages).
Pattnayak et al., "Antenna Design and RF Layout Guidelines," Cypress Semiconductor Corporation, Document No. 001-91445 Rev. H, pp. 1-60, 2023, www.cypress.com.
Peshal B. Nayak et al., "A Novel Compact Dual-Band Antenna Design for WLAN Applications," arxiv.org, Cornell University Library, 201 Olin Library Cornell University, Ithaca, NY 14853, May 12, 2021, XP081973069 (6 pages).
Plug Loads—GSA Sustainable Facilities Tool, US General Services Administration, 1 page, 2023.
Power Meter with Antenna 2118284-1 Rev, 1 pages, Jun. 2018.
Preuveneers et al., "Intelligent Widgets for Intuitive Interaction and Coordination in Smart Home Environments," IEEE Eighth International Conference on Intelligent Environments, pp. 157-164, 2012.
Proliphix, Inc., "Proliphix IP Devices: http api," 28 pages, Jan. 23, 2006.

(56) References Cited

OTHER PUBLICATIONS

Proliphix, Inc., Remote Management User Guide, 12 pages, prior to Aug. 27, 2007.
Punn et al., "Monitoring COVID-19 social distancing with person detection and tracking via fine-tuned YOLO v3 and Deepsort techniques," 10 pages, May 6, 2020.
Quirk, "A Brief History of BIM," Arch Daily, Dec. 7, 2012.
Rennings et al., "A Compact Single/Dual-Band Printed Inverted-F Type Antenna Structure," 8 pages, 2004.
Reuster et al., "A High-Efficiency Broadband HF Wire-Antenna System," IEEE Antennas and Propagation Magazine, vol. 42, No. 4, pp. 53-61, Aug. 2000. Accessed on May 31, 2022.
Richard Rogan et al., "Smart and Final Food Stores: A Case Study in Web Based Energy Information and Collection," Web Based Energy Information and Control Systems: Case Studies and Application, Chapter 6, p. 59-64, 2005.
Risbeck et al; "Modeling and Multiobjective Optimization of Indoor Airborne Disease Transmission Risk and Associated Energy Consumption for Building HVAC Systems," Energy and Buildings, vol. 253, 24 pages, 2021.
RP-C Pro, Product Datasheet, 1 page, Schneider Electric, 2022.
Saltzman, "Sky-High Electric Bill? Save with Smart Power Outlets, Power strips, LED Bulbs, Thermostats," USA Today, 1 page, 2022.
Samad et al., "Leveraging the Web: A Universal Framework for Building Automation," Proceedings of the 2007 American Control Conference, Jul. 11, 2007.
Sharp, "Actius AL3DU 3D LC Display High Performance 3D Visualization," 2 pages, prior to Mar. 17, 2006.
Shhedi et al., "Traditional and ICT Solutions for Preventing the Hospital Acquired Infection", 2015 20th International Conference on Control Systems and Computer Science, IEEE, May 27, 2015, pp. 867-873, XP033188038.
Silva et al., "Cough localization for the detection of respiratory diseases in pig houses," ScienceDirect, 7 pages, May 28, 2008.
Sinha et al., "9 Key attributes of energy dashboards and analytics tools," https://www.greenbiz.com/blog/2013/08/28/9- key-attributes-energy-dashboards-and=analytics-tools, Aug. 28, 2013.
Sinha et al; "Balance Infection Risk, Sustainability and Comfort with Open Blue," Johnson Controls, 2 pages, 2021.
Sinopoli, "Dashboards For Buildings," http://www/automatedbuildings.com/news/dec10/articles/sinopoli/101119034404sinopoli.html, Dec. 2010.
Sinopoli, "Modeling Building Automation and Control Systems," http://www.automatedbuildings.com/news/jun13/articles/sinopoli/130521122303sinopoli.html, Jun. 2013.
Siretta, Echo-14 5G/4G/Dual Band Wi-Fi Compact PCB Embedded Antenna Datasheet, Rev 3.2, 20 pages, 2024.
So et al., "Building Automation on the Information Superhighway," ASHRAE (American Society of Heating Refrigerating, and Air Conditioning) Transactions, vol. 104, Part 2, pp. 176-191, 1998.
So et al., "Building Automation Systems on the Internet," Facilities vol. 15, No. 5/6, pp. 125-133, May/Jun. 1997.
Spacelogic RP-C Pro, Product Datasheet, 30 pages, Product Version 2022, Oct. 9, 2023.
Sundramoorthy et al., "DEHEMS: A User-Driven Domestic Energy Monitoring System," Conference Paper, IEEE, 9 pages, Jan. 2011.
Talon, "Raptor Controller," 6 pages, Oct. 2003.
"America's Largest Managed Security Services Provider Launches Comprehensive, Integrated Covid-19 Safety Program for Office Buildings and Suites," KastleSafeSpaces, 5 pages, May 11, 2020.
"An Overview of NiagraAX: A comprehensive software platform designed to create smart device applications," Tridium, Inc., 2005.
"Attune Advisory Services," press release, Honeywell International Inc., Mar. 20, 2012.
"BACnet Protocol Implementation Conformance Statement" for enteliWEB, Delta Controls, Jul. 17, 2013.
"Biometric Door Reader With Body Temperature Detection," Kintronics, 9 pages, accessed May 21, 2020.
"Body Surface Temperature Screening with Alarm Function TVS-200IS/TVS-500IS," Nippon Avionics Co., 3 pages, accessed May 21, 2020.
"BriefCam announces video analytics innovation for contact tracing, physical distancing, occupancy management and face mask detection," BriefCam LTD, 11 pages, Jun. 5, 2020.
"Building Automation Software Solutions," Iconics, 2013.
"Contact Tracing Now Available on Identiv's Hirsch Velocity Access Control Platform," IDENTIV, 5 pages, May 21, 2020.
"Creston Special Report: How Intelligent building management solutions are reducing operational costs," Creston, 2012.
"Data analytics and smart buildings increase comfort and energy efficiency", https://www.microsoft.com/itshowcase/Article/Content/845/Data-analytics-and-smart-buildings-increase-comfort-and-energy-efficiency, Dec. 19, 2016, 8 pages.
"Facial Attendace System With Temperature Screening Now In India," IANS, 5 pages, Mar. 19, 2020.
"FebriEye—AI Based Thermal Temperature Screening System," vehant, 1 page, 2020.
"How Smarter AI-Powered Cameras Can Mitigate the Spread of Wuhan Novel," AnyConnect, 22 pages, 2020.
"How to fight COVID-19 with machine learning," DataRevenue, 20 pages, accessed May 25, 2020.
"INNCONTROL 5," Honeywell, 2 pages, Aug. 8, 2018.
"Intelligent Building Management Systems in Miami," Advanced Control Corp., Mar. 7, 2013.
"IP Door Access Control," KINTRONICS, 21 pages, 2014.
"Kogniz AI Health Response Platform," KOGNIZ, 9 pages, accessed May 21, 2020.
"Machine Learning Could Check If You're Social Distancing Properly at Work," MIT Technology Review, 7 pages, Apr. 17, 2020.
"NEC launches dual face biometric and fever detection system for access control," BIOMETRIC Update, 4 pages, May 8, 2020.
"NiagraAX Product Model Overview," Tridium, Inc., 2005.
"Phoenix Controls Portal," Phoenix Controls, Inc., 2013.
"Plan to Re-Open," EHIGH, 16 pages, accessed Jun. 13, 2020.
"Remote temperature monitoring," AXIS Communication, 10 pages, 2014.
"See The World In A New Way Hikvision Thermal Cameras," HIKVISION, 12 pages, 2017.
"The Ohio State University," BACnet International Journal, vol. 5, p. 4, Jan. 2013.
"Thermal Imaging SmartPhone Can Be used For Temperature Screening of People," CAT, 3 pages, accessed Jul. 13, 2020.
"WEBs-AX Web-Enabled Building Solutions," sales brochure, Honeywell International Inc., Mar. 2009.
*http://www. docs. hvacpartners. com/idc/grou ps/public/documents/techlit/gs-controls-ivuccn.rtf, "Products," 5 pages, printed Jul. 3, 2007.
"4.0 Today's Activities, The Home Dashboard," CRBM info@hand website, 46 pages, prior to Apr. 25, 2013.
"ASHRAE Dashboard Research Project," 2 pages, Aug. 28, 2008.
"Energy Manager User Guide," Release 3.2, Honeywell, 180 pages, 2008.
"Free Facilities Dashboards," eSight Energy Website, 2 pages, prior to Apr. 25, 2013.
"Fuzzy Logic Toolbox 2.1, Design and Stimulate Fuzzy Logic Systems," The MathWorks, 2 pages, May 2004.
"Junk Charts, Recycling Chartjunk as junk art," 3 pages, Oct. 2, 2006.
"Model Predictive Control Toolbox 2, Develop Internal Model-Based Controllers for Constrained Multivariable Processes," The MathWorks, 4 pages, Mar. 2005.
"Statistics Toolbox, for Use with Matlab," User's Guide Version2, The MathWorks, 408 pages, Jan. 1999.
"Vykon Energy Suite Student Guide," Tridium Inc., 307 pages, Mar. 3, 2006.
"Web Based Energy Information Systems for Energy Management and Demand Response in Commercial Buildings," California Energy Commission, 80 pages, Oct. 2003.
A Bold New Direction, "The Next Generation Global Integration Controller", 7 pages. (date not available).

(56) References Cited

OTHER PUBLICATIONS

ABB, "White Paper-Predictive Maintenance Goes Mainstream", Memphis, TN, 5 pages, 2020.
Ahn et al., "A Compact Printed Dual-Band WLAN Antenna with a Shorted Coupling Strip for Mobile Terminals." Proceedings of APMC 2012, Kaosiung, Taiwan, pp. 313-315, Dec. 4-7, 2012.
Alam et al., "A Dual-Band CPW-fed miniature planar antenna for S-, C-, WiMAX, WLAN, UWB and X-band applications," Scientific Reports, vol. 12: Article No. 7584, 16 pages, Published May 9, 2022.
Alerton Building Controls, Gallery Prints, 7 pages, Dec. 19, 2013.
Allain, "Trying out the iPhone Infrared Camera: The FLIR One," WIRED, 15 pages, 2014.
Andover Controls World, 4 pages, Spring 1997.
Andover Controls, Network News, vol. 2, No. 2, 8 pages, 1997.
ASHRAE Research for EMCS Dashboard, available online at: <https://www.taylor-engineering.com/dashboard/>, May 30, 2013, 2 pages.
Automated Buildings.com Press Release—New Products, BACnet Testing Laboratories, 9 pages, Nov. 2016.
Extended European Search Report, EP application No. 20151295.1, pp. 13, May 26, 2020.
Extended European Search Report, EP Application No. 24150166.7, European Patent Office, Jun. 7, 2024 (9 pages).
Extended European Search Report, EP Application No. 24151591.5, European Patent Office, Jun. 4, 2024 (8 pages).
Fully Web-Based BACnet Compliant Building Management System, WEBfactory, 1 page, 2023.
Ganguty, "Gurugram-based startup Staqu has modified AI-powered JARVIS to battle coronavirus," Yourstory, 7 pages, Mar. 31, 2020.
GB Search Report, GB Application No. GB2101308.1, dated Jul. 23, 2021 (7 pages).
Hasan et al., "Dual Band Metamaterial Antenna For LTE/Bluetooth/WiMax System," Scientific Reports, vol. 8, Article No. 1240, 17 pages, Published Online Jan. 19, 2018.
Hiliwi Technology, HLW8110/HLW8112 Datasheet, Rev 1.01, 74 pages, Updated Schematic, Nov. 20, 2020.
HLW Technology (Registered), HLW8110/HLW8112 DataSheet, REV 1.01, 74 pages. (date not available).
Honeywell News Release, "Honeywell's New Sysnet Facilities Integration System for Boiler Plant and Combustion Safety Processes," 4 pages, Dec. 15, 1995.
Honeywell, "Excel Building Supervisor-Integrated R7044 and FS90 Ver. 2.0," Operator Manual, 70 pages, Apr. 1995.
Honeywell, "Product Guide 2004," XP-002472407, 127 pages, 2004.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, Excel 15B W7760B Building Manager Release 2.02.00, Installation Instructions, 28 pages, Dec. 2004.
Honeywell, The RapidZone Solution, Excel 5000 Open System, Application Guide, 52 pages, Jan. 2004.
How Pert's Smart Home Automation Products can help you Save Energy & Money, Pert™ 25 pages, Dec. 5, 2021. Accessed Oct. 26, 2022.
http://pueblo.lbl.gov/~olken . . . , "Remote Building Monitoring and Operations Home Page," 5 pages, prior to Aug. 27, 2007.
http://www.ccbac.com, "C&C (/)—Omniboard," 5 pages, Dec. 19, 2013.
http://www.commercial.carrier.com/commercial/hvac/productdescription . . . , "Carrier: 33CSCCNWEB-01 CCN Web Internet Connection to the Carrier Comfort Network," 1 page, printed Mar. 11, 2008.
http://www.commercial.carrier.com/commercial/hvac/productdescription . . . , "Carrier: i-Vu CCN," 1 page, printed Mar. 11, 2008.
http://www.domcontroller.com/en/, "DomController Home Automation Software—Control Anything from Anywhere," 11 pages, printed Jan. 6, 2015.
http://www.ecobee.com/productspecifications, "Programmable Thermostats and Other Green Living Products—Specifications," 2 pages, 2009.
http://www.lightstat.com/products/istat.asp, Lightstat Incorporated, "Internet Programmable Communicating Thermostats," 1 page, printed Mar. 13, 2007.
http://www.novar.com/ems-bas/opus-building-automation-system, "Novar Opus Bas," 1 page, prior to Feb. 13, 2013.
http://www.sharpsystems.com/products/pc_notebooks/actius/rd/3d/, "Actius RD3D Desktop Replacement Notebook with Industry-Breakthrough 3D Screen," Sharp, 1 page, printed Jun. 16, 2005.
http://www2.sims.berkeley.edu/courses/is213/s06/projects/lightson;final.html, "Lights On A Wireless Lighting Control System," 11 pages, printed Mar. 22, 2007.
I-stat, Demo Screen Shots, 9 pages, printed Mar. 13, 2007.
I-stat, The Internet Programmable Thermostat, 2 pages, prior to Aug. 27, 2007.
I.Lon 100e3 Internet Server, 1 page, prior to Aug. 27, 2007.
I.Lon, SmartServer, 2 pages, prior to Aug. 27, 2007.
I4BACnet The Web-based Management Control System for your Building Management System, 5 pages, Ewon® By HMS Networks, 2023. Accessed Oct. 26, 2023.
Infineon Technologies, "Predictive Maintenance and Condition Monitoring," 17 pages, Downloaded Sep. 14, 2023.
Instituto Superior Tecnico, "A 3D Interactive Environment for Automated Building Control," Master's Dissertation, 120 pages, Nov. 2012.
International Search Report and Written Opinion received for PCT Patent Application No. PCT/CN2022/128109, mailed on Jun. 23, 2023, 6 pages.
International Search Report and Written Opinion received for PCT Patent Application No. PCT/CN2022/128112, mailed on Dec. 29, 2022, 6 pages.
International Search Report and Written Opinion received for PCT Patent Application No. PCT/CN2022/128113, mailed on Jul. 5, 2023, 6 pages.
International Search Report and Written Opinion received for PCT Patent Application No. PCT/CN2022/128115, mailed on Jun. 23, 2023, 9 pages.
Jeffrey Ball, "Green Goal of 'Carbon Neutrality' Hits Limit," TheWall Street Journal, 7 pages, Dec. 30, 2008.
Johnson Controls and Microsoft Announce Global Collaboration, Launch Integration between Open Blue Digital Twin and Azure Digital Twins, 7 pages, 2022. Accessed Aug. 29, 2022.
Johnson Controls Develops Industry-first AI Driven Digital Solution to Manage Clean Air, Energy, Sustainability, Comfort and Cost in Buildings, 7 pages, 2022. Accessed Aug. 29, 2022.
Johnson Controls, Network Integration Engine (NIE) 3 pages, Nov. 9, 2007.
Johnson Controls, Network Integration Engine (NIE), Product Bulletin, pp. 1-11, Jan. 30, 2008.
Johnson Controls, Verasys System European User's Guide, 30 pages, Release 4.0, Oct. 30, 2020,.
Johnson Controls, Verasys System European User's Guide, 38 pages, 2023. Accessed Oct. 26, 2023.
Kim et al., "Applicance Classification by Power Signal Analysis Based on Multi-Feature Combination Multi-Layer LSTM," Energies, vol. 12, pp. 1-24. Published Jul. 21, 2019.
Kourti, "Process Analysis and Abnormal Situation Detection: From Theory to Practice," IEEE Control Systems Magazine, p. 10-25, Oct. 2002.
Kufakunesu et al., A Survey on Adaptive Data Rate Optimization in LoRaWAN: Recent Solutions and Major Challenges, Sensors, vol. 20, No. 5044, 25 pages, Published Sep. 5, 2020.
Lacey, "The Top 10 Software Vendors Connecting Smart Buildings to the Smart Grid," http://www.greentechmedia.com/articles/read/the-top-10-companies-in-enterprise-smart-grid, Jul. 18, 2013.
Lamensdorf et al., "Dual-Band Quadrifiliar Helix Antenna," IEEE, p. 488-491, 2001. Accessed May 31, 2022.
Legrand Brand Photos, Prior Art Product, 1 page, Photos dated on or before Nov. 30, 2023.
Awesome Things you can do with a Smart Plug—Blog—carbonTRACK® 1 page, 2021.

(56) References Cited

OTHER PUBLICATIONS

Ball, Green Goal of 'Carbon Neutrality' Hits Limit, TheWall Street Journal, 7 pages, Dec. 30, 2008.
Bell et al., "Early Event Detection—Results from A Prototype Implementation," AICHE Spring National Meeting, 15 pages, Apr. 2005.
Bobker et al., "Operational Effectiveness in Use of BAS," Proceedings of the 13th International Conference for Enhanced Building Operations, Oct. 8, 2013.
Bocicor et al. "Wireless Sensor Network based System for the Prevention of Hospital Acquired Infections", arxiv.org, Cornell University Ithaca, NY 14853, May 2, 2017, XP080947042, (Abstract).
Bouktif et al., "Optimal Learning LSTM Model for Electric Loan Forecasting Using Feature Selection and Genetic Algorithm: Comparison with Machine learning Approaches," Energies, vol. 11, pp. 1-20. Published Jun. 2018.
CADGRAPHICS, "The CADGRAPHICS User's Guide," 198 pages, 2003.
Carrier Comfort Network CCN Web, "Web Browser User Interface to the Carrier Comfort Network," 2 pages, 2002.
Carrier Comfort Network CCN Web, Overview and Configuration Manual, 134 pages, Apr. 2006.
Carrier Comfort Network CCN Web, Product Data, 2 pages, Apr. 2006.
Carrier, "i-Vu Powerful and Intuitive Front End for Building Control," 2 pages, Aug. 2005.
Carrier, "i-Vu Web-Based Integrated Control System," 3 pages, 2005.
Carrier, Demo Screen Shots, 15 pages, prior to Aug. 27, 2007.
Carrier, i-Vu CCN 4.0, Owner's Guide, 20 pages, Jul. 2007.
Carrier, i-Vu CCN, 7 pages, 2007.
Carter, "Industrial Energy Management Dashboards Require a Toolkit," Cross Automation, 11 pages, Nov. 4, 2013.
Castangia et al., "Detection of Anamolies in Household Appliances from Disaggregated Load Consumption," International Conference on Smart Energy Systems and Technologies, 2021. 6 pages. Downloaded on Oct. 30, 2023 from IEEE Xplore.
Castelo, "A 30 Interactive Environment for Automated Building Control," Elsevier, Nov. 8, 2012.
Castle, "7 Software Platforms that Make Building Energy Management Easy," http://greentechadvocates.com/2012/11/28/7-software-platforms-that-make-building-energy-managment-easy/, Nov. 28, 2012.
Cericola, The 4 Best Plug-In Smart Outlets of 2023, Reviews by New York Times Wirecutter, 5 pages, Updated Oct. 25, 2023. Accessed Oct. 26, 2023.
Cericola, The Best Plug-In Smart Outlet, Reviews by New York Times Wirecutter, 1 page, 2022.
Chan, "Rank Revealing QR Factorizations," Linear Algebra and It's Applications, vol. 88-89, p. 67-82, Apr. 1987.
Cimetrics BACnet Explorer (B5001), 9 pages, 2023. Accessed Oct. 26, 2023.
Circon, "i-Browse Web-Based Monitoring and Control for Facility Management," 2 pages, prior to Aug. 27, 2007.
Controller BACnet/IP (750-831) WAGO India, 5 pages, 2023. Accessed Oct. 26, 2023.
Copper Cube Setup Guide, Copper Tree Analytics, Delta Controls Inc., Document Edition 3.0, 20 pages, Feb. 2020.
Published Australian Application 2009904740, 28 pages, Application Filed on Sep. 29, 2009.
Search Report and Written Opinion from related International PCT Application No. PCT/US2018/025189 dated Jul. 17, 2018 (12 pages).
U.S. Appl. No. 14/109,496, filed Dec. 17, 2013.
U.S. Appl. No. 14/169,071, filed Jan. 30, 2014.
U.S. Appl. No. 14/169,083, filed Jan. 30, 2014.
U.S. Appl. No. 14/461,188, filed Aug. 15, 2014.
U.S. Appl. No. 14/482,607, filed Sep. 10, 2014.
Dasgupta, "Your voice may be able to tell you if you have Covid," Hindustan Times, 4 pages, Apr. 16, 2020.
Donnelly, "Building Energy Management: Using Data as a Tool", http://www.buildingefficiencyinitiative.org/sites/default/files/legacy/InstituteBE/media/Library/Resources/Existi ng-Buil ding-Retrofits/Using-Buil ding-Data-as-a-Tool.pdf, Oct. 2012, 9 pages.
e-homecontrols.com, "e-Home Controls Website," link to actual website no longer works, 1 page, prior to Dec. 19, 2013.
Echelon, "Energy Control Solutions with the i.Lon SmartServer," 4 pages, 2007.
Echelon, "i.Lon 100e3 Internet Server Models 72101R-300, 72101R-308, 72102R-300, 72103-R300 . . . " 5 pages, copyright 2002-2007.
Echelon, "i.Lon 100e3 Internet Server New Features," 15 pages, Sep. 2006.
Echelon, "i.Lon SmartServer," 5 pages, 2007.
Ecobee, "Meet the Ecobee Smart Thermostat," Sales Sheet, 2 pages, prior to Jun. 16, 2009.
Ecobee, Screenshot of Ecobee Web Site Window, Captured prior to Jun. 16, 2009.
Ecobee, Smart Installation Manual, pp. 1-26, 2009.
Ecobee, Smart Thermostat User Manual, pp. 1-32, 2009.
EMbox Timer Switch Electrical On Off-Automatic Power Cut Off Smart Plug, Amazon Product Sheet, 1 page 2022.
Energy Management Savings Tips for Hotels, Hotel Management Newsletter, 7 pages, 2022. Accessed Oct. 26, 2022.
EnteliWEB catalog sheet, Delta Controls, Inc., 2012.
EnteliWEB catalog sheet, Delta Controls., 2010.
EnteliWEB product from Delta Controls, web pages retrieved on May 9, 2013 from http://deltacontrols.com/products/facilities-management/supervisory-software et seq. by the Internet Archive at web.archive.org.
EP Extended European Search Report, EP Application No. 23201990.1, European Patent Office, Apr. 26, 2024 (13 pages).
Talon, "Workstation Software," 4 pages, Nov. 2002.
The 4 Best Practices to Conserve Energy in Schools—Blog—Entrak Hong Kong Limited, 1 page, 2022.
The Hub Technical Datasheet, Intuitive IoT Gateway, V1.4, 5 pages, 2022.
Trane (Registered), "Creating Input/Output Object", BMTW-SVP01D-EN, pp. 226-421. (date not available).
Trane (Registered), "Using the Graphics Editor", pp. 422-601. (date not available).
Trane, "System Programming, Tracer Summit Version 14, BMTW-SVP01 D-EN," 623 pages, 2002.
U.S. Appl. No. 18/750,560, filed Jun. 21, 2024.
Wago I/O System Series 750/753, Decentralized Automation Technology, 66 pages, Wago Techdocs, System Manual Version 3.3.3, 2023.
Wattsense Hub, Technical Datasheet,Intuitive IoT Gateway, 6 pages, 247able.com, V1.3, 2021.
Wikipedia, Inverted-F Antenna, pp. 1-6, 2023. Accessed Jan. 25, 2023.
Wu et al., "A Web 2.0 Based Scientific Application Framework," 7 pages, prior to Jul. 24, 2014.
www.geappliances.com/home-energy-manager/about-energy-monitors.htm, "Energy Monitor, Home Energy Monitors, GE Nucleus," 2 pages, printed Jan. 15, 2013.
www.luciddesigngroup.com/network/apps.php#homepage, "Lucid Design Group—Building Dashboard Network—Apps," 7 pages, Jan. 15, 2013.
Xiamoi Smart Plug 2, (Wi-Fi), Overview, 1 page, 2023.
Zito, "What is Tridium Part 1," http://blog.buildingautomationmonthly.com/what-is-tridium/, May 12, 2013.
Zito, "What is Tridium Part 2," http://blog.buildingautomationmonthly.com/tridium-part-2/, Sep. 10, 2013.

* cited by examiner

Effective received power with
calibration factor and constant elevation

Effective received power with
calibration factor and constant azimuth

COMPACT PRINTED CIRCUIT BOARD IMPLEMENTED ANTENNA

The present application claims priority to PCT International Application No. PCT/CN2024/073188, filed on Jan. 19, 2024, entitled "COMPACT PRINTED CIRCUIT BOARD IMPLEMENTED ANTENNA", which is incorporated herein by reference.

TECHNICAL FIELD

The present disclosure relates generally to antennas and more particularly to printed circuit board-implemented antennas.

BACKGROUND

Many devices include an antenna that is used to support wireless communication with one or more other devices. What would be desirable is an antenna design that is compact, inexpensive, has a defined frequency band with low return loss, and at least a partial omni directional pattern.

SUMMARY

The present disclosure relates generally to antennas and more particularly to printed circuit board-implemented antennas. An example may be found in a printed circuit board implemented antenna that includes a first antenna leg supported by a printed circuit board, the first antenna leg having a length and a width. A first end region of the first antenna leg is operatively connected to an antenna signal trace of the printed circuit board, and a second end region of the first antenna leg extends away from the first end region of the first antenna leg in a first direction. The printed circuit board implemented antenna includes a second antenna leg supported by the printed circuit board, the second antenna leg having a length and a width. A first end region of the second antenna leg is connected to the second end region of the first antenna leg, and a second end region of the second antenna leg extends away from the first end region of the second antenna leg in the first direction, wherein a centerline along the length of the second antenna leg is laterally offset from a centerline along the length of the first antenna leg. The printed circuit board implemented antenna includes a third antenna leg supported by the printed circuit board, the third antenna leg having a length and a width. A first end region of the third antenna leg is connected to the second end region of the second antenna leg, and a second end region of the third antenna leg extends away from the first end region of the third antenna leg in a second direction that is orthogonal to the first direction. The printed circuit board implemented antenna includes a fourth antenna leg supported by the printed circuit board, the fourth antenna leg having a length and a width. A first end region of the fourth antenna leg is connected to the second end region of the third antenna leg, and a second end region of the fourth antenna leg extends away from the first end region of the fourth antenna leg in the first direction. The printed circuit board implemented antenna includes a fifth antenna leg supported by the printed circuit board, the fifth antenna leg having a length and a width. A first end region of the fifth antenna leg is connected to the second end region of the first antenna leg, and a second end region of the fifth antenna leg extends away from the first end region of the fifth antenna leg in the second direction that is orthogonal to the first direction. The printed circuit board implemented antenna includes a sixth antenna leg supported by the printed circuit board, the sixth antenna leg having a length and a width. A first end region of the sixth antenna leg is connected to the second end region of the fifth antenna leg, and a second end region of the sixth antenna leg extends away from the first end region of the sixth antenna leg in a direction opposite to the first direction and operatively connected to a ground plane of the printed circuit board.

Another example may be found in a printed circuit board implemented antenna that includes a plurality of antenna legs arranged within a rectangular area on a printed circuit board of less than 80 square millimeters with each of the plurality of antenna legs formed using one or more metal layers of the printed circuit board. The plurality of antenna legs arranged to provide a return loss of less then −10 dB at 2.4 GHz.

Another example may be found in a printed circuit board implemented antenna that includes two parallel extending antenna segments supported by a printed circuit board, wherein a first end region of a first one of the two parallel extending antenna segments is operatively connected to an antenna signal trace of the printed circuit board, and a first end region of a second one of the two parallel extending antenna segments is operatively connected to a ground plane of the printed circuit board. A second end region opposite the first end region of the first one of the two parallel extending antenna segments is operatively connected via an interconnecting segment to a second end region opposite the first end region of the second one of the two parallel extending antenna segments. An antenna tail is operatively connected to the interconnecting segment. The antenna tail having a length that is at least twice as long as the first one of the two parallel extending antenna segments and at least twice as long as the second one of the two parallel extending antenna segments.

BRIEF DESCRIPTION OF THE FIGURES

The disclosure may be more completely understood in consideration of the following description of various examples in connection with the accompanying drawings, in which.

Figure 1:
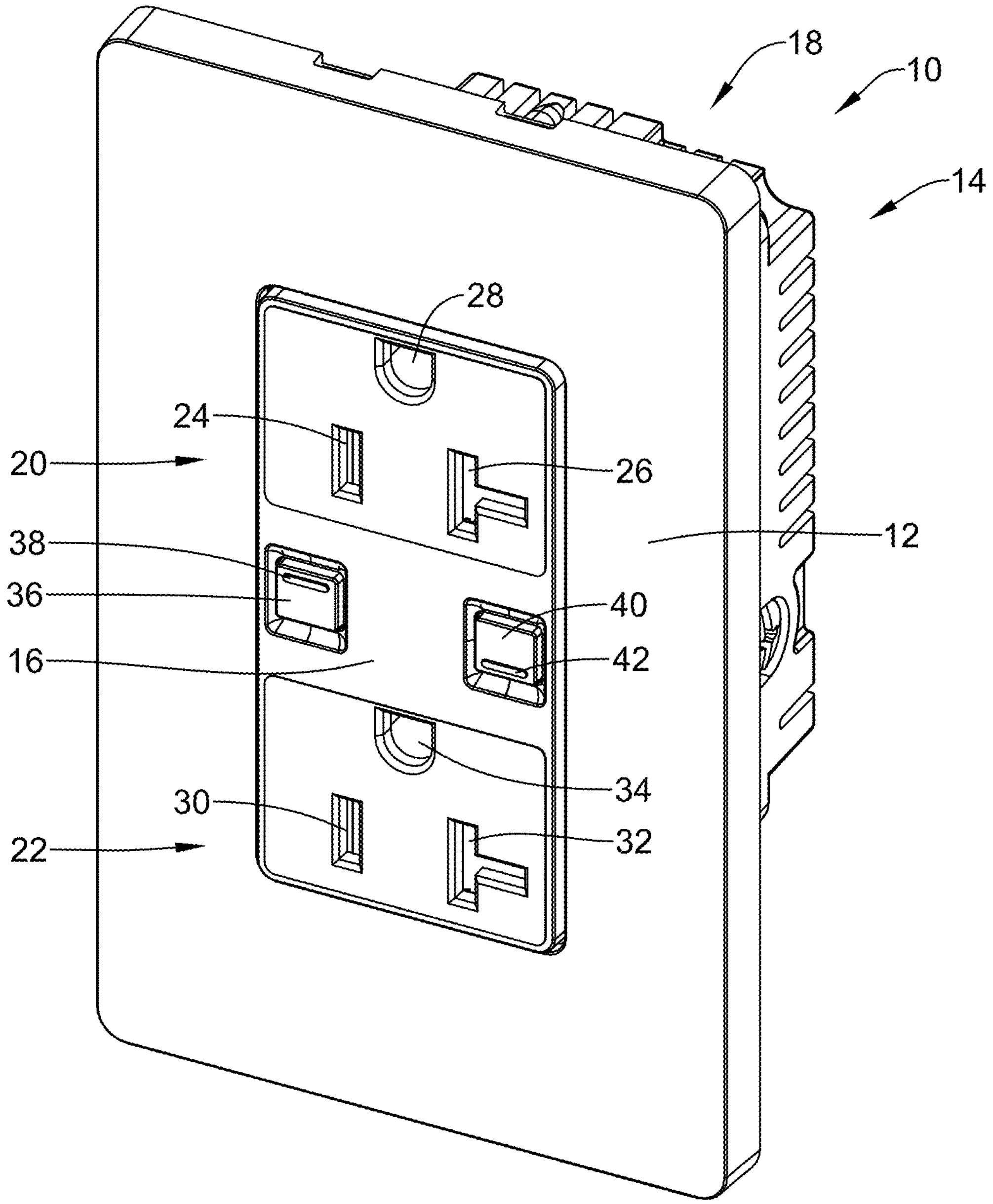
FIG. 1 is a perspective view of an illustrative outlet socket including one or more trim plates and having a first socket receptacle style.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a perspective view of an illustrative outlet socket 10 shown with a trim plate 12. In some cases, there may be one or more additional trim plates (not shown) underneath the trim plate 12. The outlet socket 10 has a housing 14 that includes a housing front 16 and a housing back 18. The outlet socket 10 includes a first outlet receptacle 20 and a second outlet receptacle 22. The first outlet receptacle 20 includes a first female hot port 24, a first female neutral port 26 and a first female ground port 28 that together are configured to accommodate a male plug (not shown) including a male hot conductor, a male neutral conductor, and a male ground connector, respectively. The first female hot port 24, the first female neutral port 26 and the first female ground port 28 may be considered as extending through the housing front 16. The second outlet receptacle 22 includes a second female hot port 30, a second female neutral port 32 and a second female ground port 34 that together are configured to accommodate a male plug (not shown) including a male hot conductor, a male neutral conductor, and a male ground connector, respectively. The second female hot port 30, the second female neutral port 32 and the second female ground port 34 may be considered as extending through the housing front 16.

The outlet socket 10 may be installed into a junction box in the illustrated orientation, in which the first female ground port 28 is atop the first outlet receptacle 20 and the second female ground port 34 is atop the second outlet receptacle 22. In some instances, the outlet socket 10 may be installed into a junction box in a reversed illustrated orientation, in which the first female ground port 28 is at the bottom of the first outlet receptacle 20 and the second female ground port 34 is at the bottom of the second outlet receptacle 22. This assumes a vertically oriented junction box.

The outlet socket 10 may be configured to be connected to a variety of different electrical power circuits. For example, the outlet socket 10 may be configured to be electrically coupled with a 10 ampere (10 A) electrical power circuit. The outlet socket 10 may be configured to be electrically coupled with a 15 ampere (15 A) electrical power circuit. As shown, the outlet socket 10 is configured to be electrically coupled with a 20 ampere (20 A) circuit. As shown, the first female neutral port 26 and the second female neutral port 32 are made to accommodate not only a flat bladed male neutral conductor (not shown), but also to accommodate a male neutral conductor that has an orthogonal orientation (such as a straight blade angle plug). In some instances, the outlet socket 10 may be considered as being a smart socket. This means that the outlet socket 10 may be configured to communicate with a remote device (e.g. remove server) that is able to monitor electrical consumption by the outlet socket 10, monitor internal temperature within the outlet socket 10 in order to detect possible overheating scenarios before a fire results, and/or remotely turn the first outlet receptacle 20 and/or the second outlet receptacle 22 on and off. These are just examples.

In some instances, the outlet socket 10 may include a first button 36 that a user may use to manually turn the first outlet receptacle 20 on or off. The first button 36 may include a first LED indicator 38 that provides an indication of the status of the first outlet receptacle 20. For example, the first LED indicator 38 may be on when the first outlet receptacle 20 is powered and the first LED indicator 38 may be off when the first outlet receptacle 20 is not powered. In some instances, the first LED indicator 38 may be any of a variety of different colors. For example, the first LED indicator 38 may glow green to indicate that the first outlet receptacle 20 is powered, and may glow red to indicate a potential problem. In some instances, as will be discussed, the first LED indicator 38 may simply be an aperture formed within the first button 36 that allows light from an LED below the first button 36 to shine through.

In some instances, the outlet socket 10 may include a second button 40 that a user may use to manually turn the second outlet receptacle 22 on or off. The second button 40 may include a second LED indicator 42 that provides an indication of the status of the second outlet receptacle 22. For example, the second LED indicator 42 may be on when the second outlet receptacle 22 is powered and the second LED indicator 42 may be off when the second outlet receptacle 22 is not powered. In some instances, the second LED indicator 42 may be any of a variety of different colors. For example, the second LED indicator 42 may glow green to indicate that the second outlet receptacle 22 is powered, and may glow red to indicate a potential problem. In some instances, as will be discussed, the second LED indicator 42 may simply be an aperture formed within the second button 40 that allows light from an LED below the second button 40 to shine through.

Figure 2:
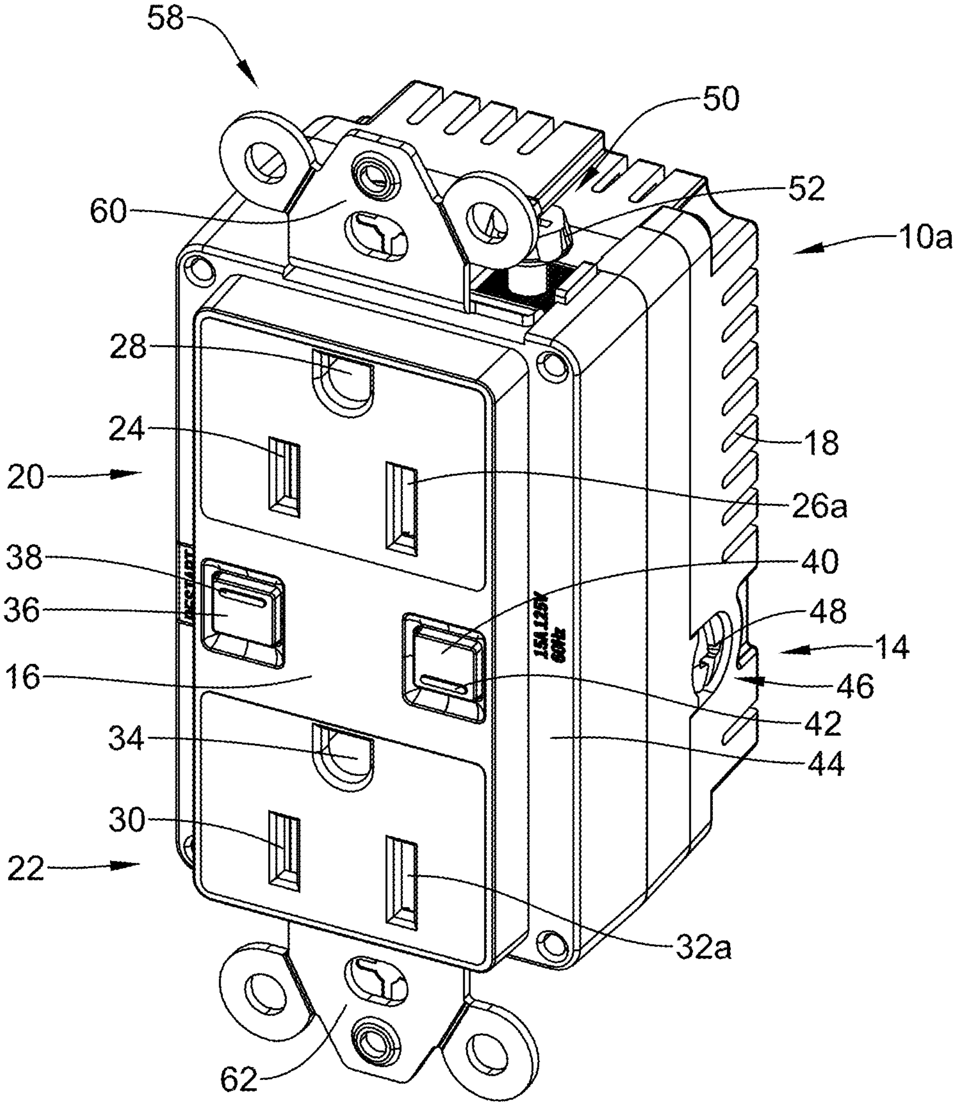
FIG. 2 is a first perspective view of an illustrative outlet socket having a second socket receptacle style.
Figure 3:
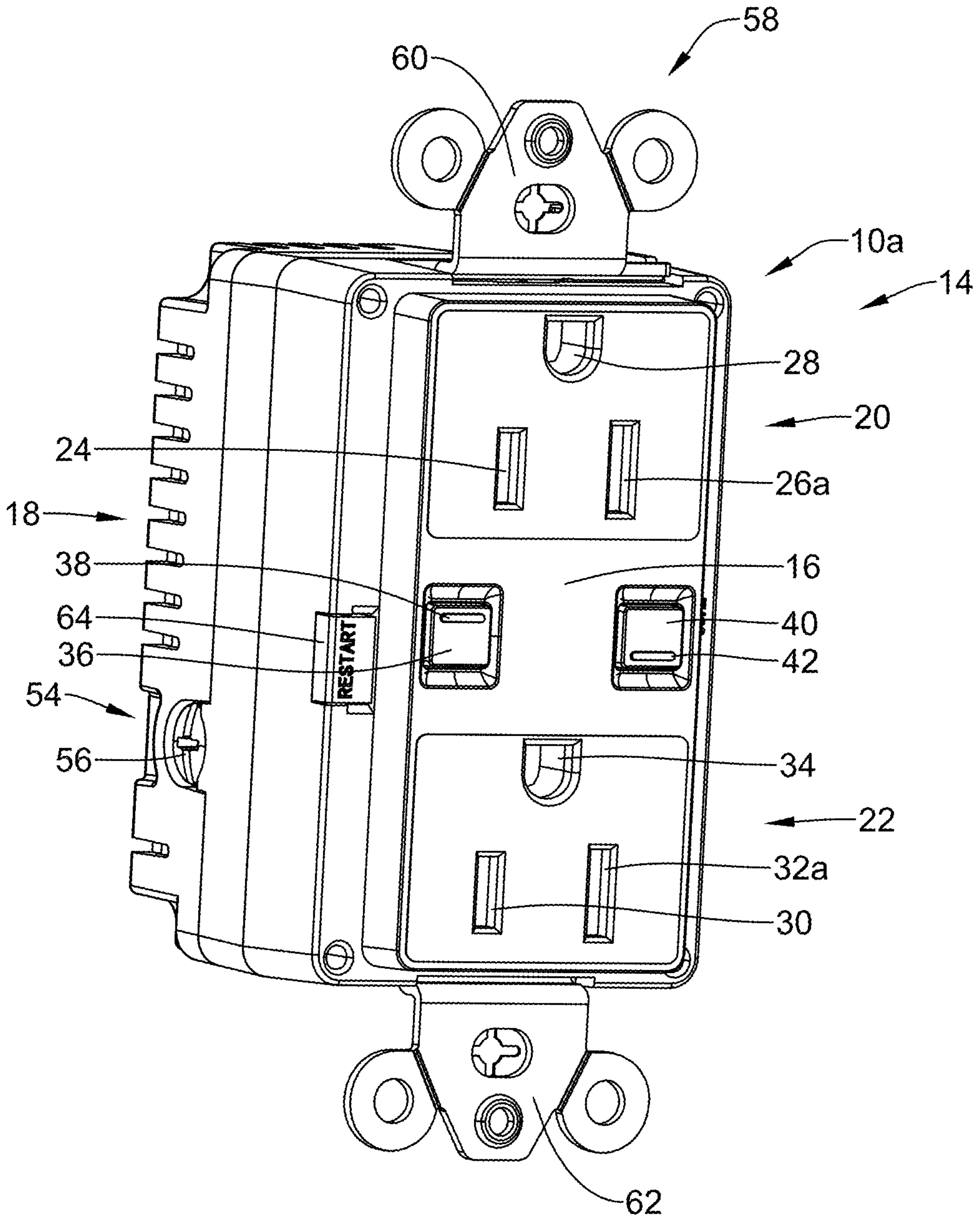
FIG. 3 is a second perspective view of the illustrative outlet socket of FIG. 2.

FIG. 2 is a first perspective view and FIG. 3 is a second perspective view of an outlet socket 10*a* that is similar to the outlet socket 10 shown in FIG. 1, but is an example of an outlet socket that is configured for a lower power rating such as a 10 ampere circuit or a 15 ampere circuit. As shown, the housing front 16 includes the first outlet receptacle 20 and the second outlet receptacle 22. One distinction over that shown in FIG. 1 is that the first neutral port 26*a* of the first outlet receptacle 20 and the second neutral port 32*a* of the second outlet receptacle 22 are designed to accommodate a first male neutral conductor component but not the corresponding orthogonally arranged second male neutral conductor component. This may signifies that the outlet socket 10*a* is designed for a lower power circuit. In particular, the housing front 16 includes a stamping or printing 44 indicating that the outlet socket 10*a* is designed for use in a 120 volt, 15 ampere circuit.

Also visible in FIG. 2 is a neutral input 46 including a screw 48 that may be used to secure a neutral power line to the neutral input 46. A ground input 50 includes a screw 52 that may be used to secure a ground power line to the ground input 50. As shown in FIG. 3, the outlet socket 10*a* includes a hot input 54 with a screw 56 that may be used to secure a hot power line to the hot input 54. The neutral input 46, the ground input 50 and the hot input 54 allow the outlet socket 10*a* to be electrically connected within a 120 volt (for example) circuit. The outlet socket 10*a* includes a ground bracket 58 with a first mounting tab 60 and a second mounting tab 62. The first mounting tab 60 and the second mounting tab 62 may be used to physically secure the outlet socket 10*a* in position within a junction box. As will be discussed and shown in subsequent drawings, the ground bracket 58 electrically connects together the ground terminals that are positioned behind the first female ground port 28 and the second female ground port 34. In some instances, the outlet socket 10*a* may include a reset button 64 that may be actuated in order to instruct the outlet socket 10*a* to reset itself (e.g. reset the controller of the outlet socket), much like resetting a small microcontroller, for example.

Figure 4:
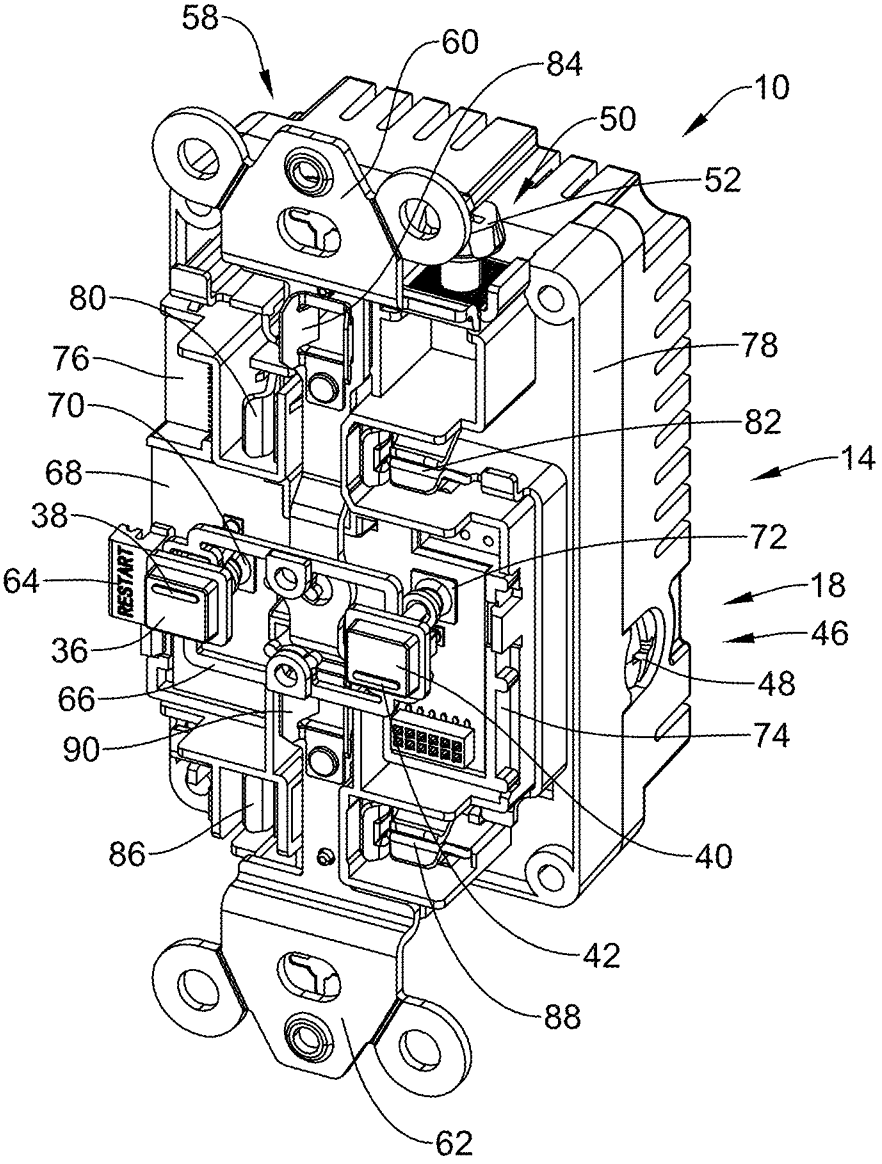
FIG. 4 is a perspective view of an illustrative outlet socket with some components removed to show internal components.

FIG. 4 shows the outlet socket 10 (or 10*a*) with the housing front 16 removed, revealing additional details regarding the outlet socket 10. The outlet socket 10 includes a resilient ring 66 that supports the first button 36 (with first LED indicator 38) and the second button 40 (with the second LED indicator 42). A user interface PCB 68 is disposed behind the resilient ring 66, and includes a first switch 70 that is actuated by depressing the first button 36 and a second switch 72 that is actuated by depressing the second button 40. A first spacer 74 is disposed behind the user interface PCB 68. A communication PCB 76 is disposed behind the first spacer 74. A second spacer 78 is disposed behind the communication PCB 76. The second spacer 78 defines a number of recesses that house the female terminals making up part of the first outlet receptacle 20 and the second outlet receptacle 22.

The first outlet receptacle 20 includes a first female hot terminal 80 that is aligned with the first female hot port 24, a first female neutral terminal 82 that is aligned with the first female neutral port 26, and a first female ground terminal 84 that is aligned with the first female ground port 28. The male hot conductor of a male plug (not shown) can extend through the first female hot port 24 and into the first female hot terminal 80 and make electrical connection therewith, the male neutral conductor of the male plug can extend through the first female neutral port 26 and into the first female neutral terminal 82 and make electrical connection therewith, and the male ground conductor of the male plug can extend through the first female ground port 28 and make electrical connection therewith. Similarly, the second outlet receptacle 22 includes a second female hot terminal 86 that is aligned with the second female hot port 30, a second female neutral terminal 88 that is aligned with the second female neutral port 32, and a second female ground terminal 90 that is aligned with the second female ground port 34. The male hot conductor of a male plug (not shown) can extend through the second female hot port 30 and into the second female hot terminal 86 and make electrical connection therewith, the male neutral conductor of the male plug can extend through the second female neutral port 32 and into the second female neutral terminal 88 and make electrical connection therewith, and the male ground conductor of the male plug can extend through the second female ground port 34 and make electrical connection therewith.

Figure 5:
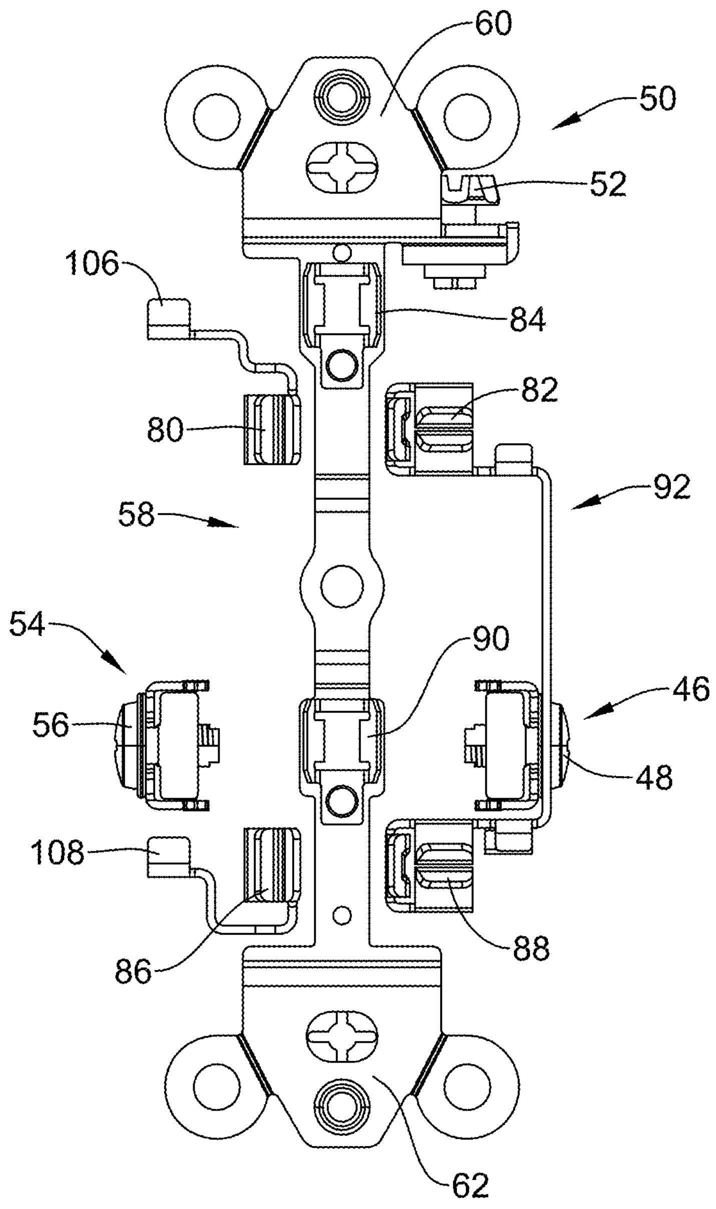
FIG. 5 is a front view of the line voltage components of the illustrative outlet socket of FIG. 4.

FIG. 5 provides a view of the line voltage components of the outlet socket 10, with each of the line voltage components spatially oriented with respect to each other in the same three dimensional positions they occupy within the outlet socket 10. While not shown in FIG. 5, the relays that selectively connect and disconnect the female hot terminals 80 and 86 with line voltage (as provided by the hot input 54) may also be considered as being line voltage components.

Figure 5A:
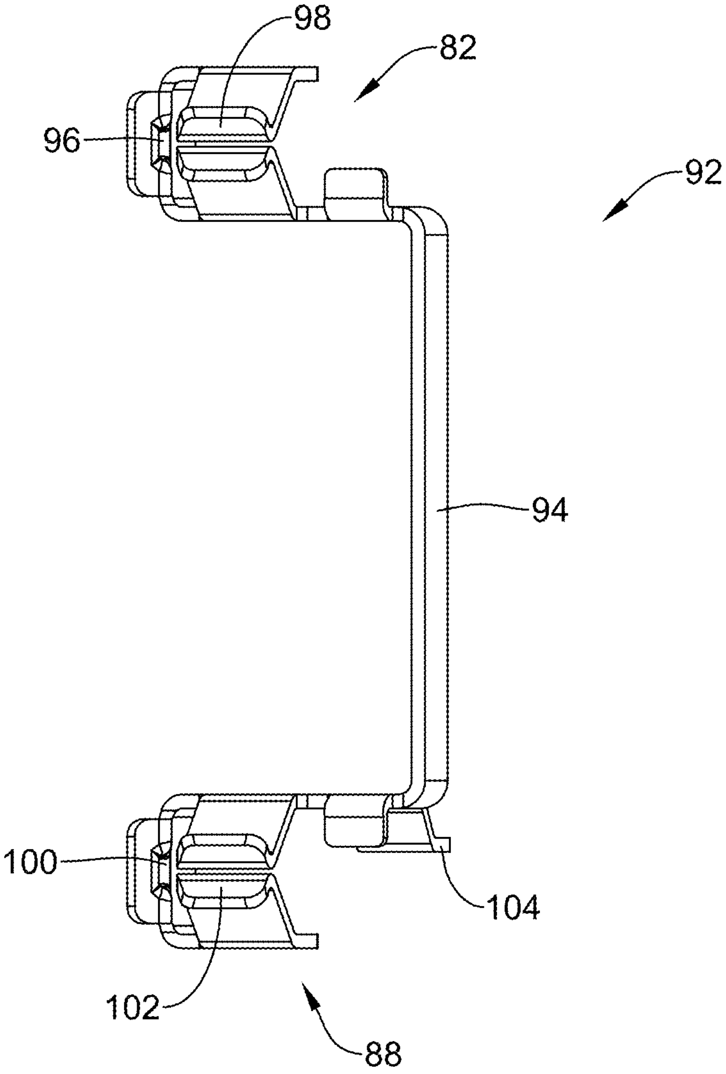
FIG. 5A is a perspective view of a neutral conductive component that is one of the line voltage components shown in FIG. 5.

FIG. 5A is a perspective view of an illustrative neutral conductive component 92 that includes the first female neutral terminal 82 and the second female neutral terminal 88. A conductive member 94 extends between the first female neutral terminal 82 and the second female neutral terminal 88, and electrically couples the first female neutral terminal 82 with the second female neutral terminal 88. In some instances, the neutral conductive component 92 is integrally formed from a single piece of metal (such as copper or brass). As noted, the outlet socket 10 (and 10*a*) may be configured to be used with a variety of different power capacity circuits, and thus the first female neutral terminal 82 and the second female neutral terminal 88 may each be configured to accommodate a male neutral conductor that includes a first male neutral conductor component and a second male neutral conductor component that is orthogonal to the first male neutral conductor component.

The first female neutral terminal 82 includes a segment 96 and a segment 98. A male neutral conductor having a single blade may be accommodated between the segment 96 and the segment 98. A male neutral conductor that has the orthogonal orientation may be accommodated within the segment 98. Similarly, the second female neutral terminal 88 includes a segment 100 and a segment 102. A male neutral conductor having a single blade may be accommodated between the segment 100 and the segment 102. A male neutral conductor that has the orthogonal orientation may be accommodated within the segment 102. The neutral conductive component 92 may include an extension 104 that serves to electrically couple the neutral conductive component 92 with the neutral input 46.

The first female hot terminal 80 (see FIG. 5) is part of a stamped piece of metal that includes a pad 106 that serves to electrically couple the first female hot terminal 80 with a relay (to be discussed) that selectively provides power to the first female hot terminal 80. Similarly, the second female hot terminal 86 is part of a stamped piece of metal that includes a pad 108 serves to electrically couple the second female hot terminal 86 with a relay (to be discussed) that selectively provides power to the second female hot terminal 86. The ground bracket 58 defines the first female ground terminal 84 and the second female ground terminal 90 and electrically couples the first female ground terminal 84, the second female ground terminal 90 and the mounting tabs 60 and 62.

Figure 6:
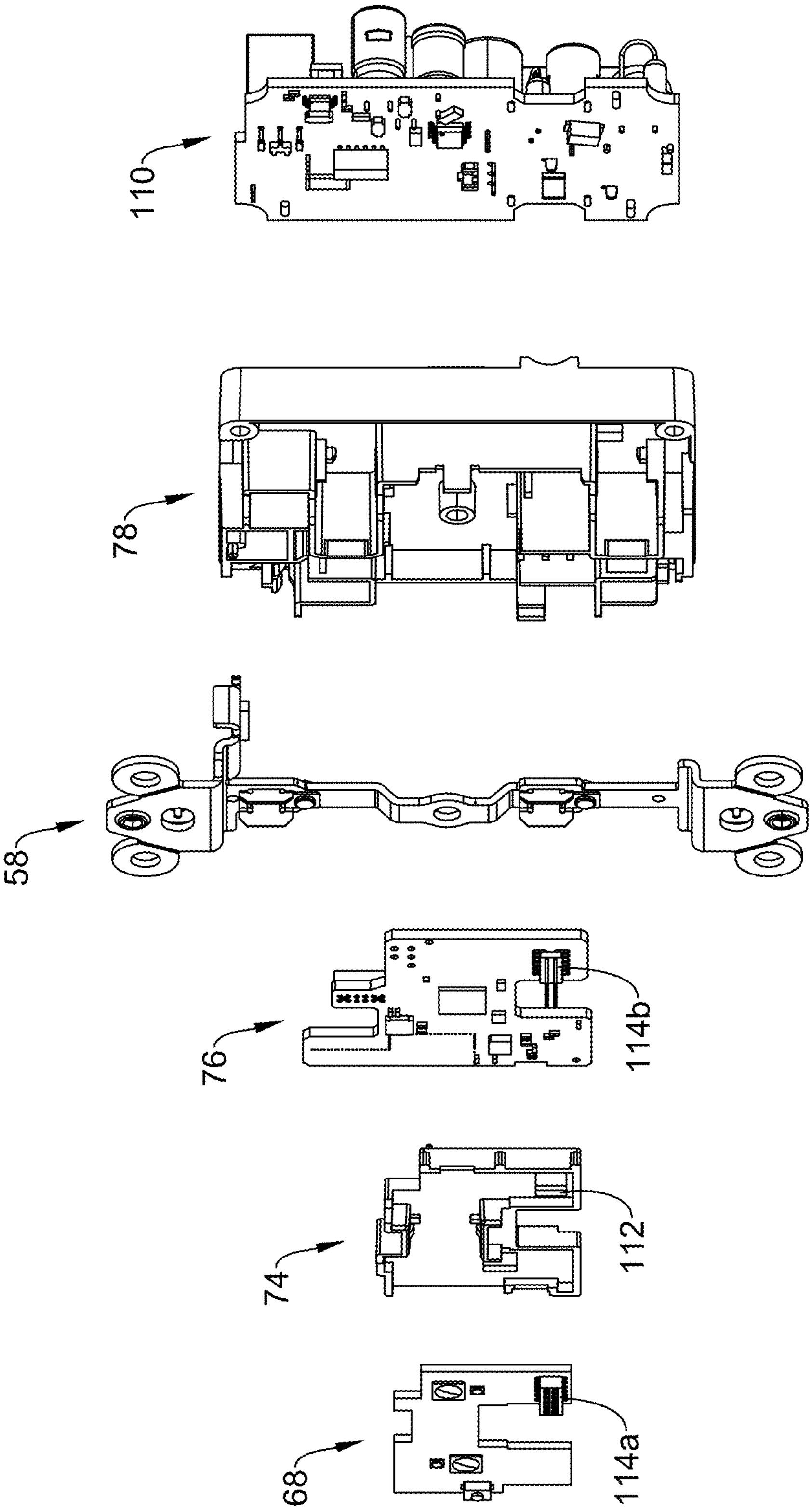
FIG. 6 is an exploded perspective view of some of the components of the illustrative outlet socket of FIG. 4.
Figure 7A:
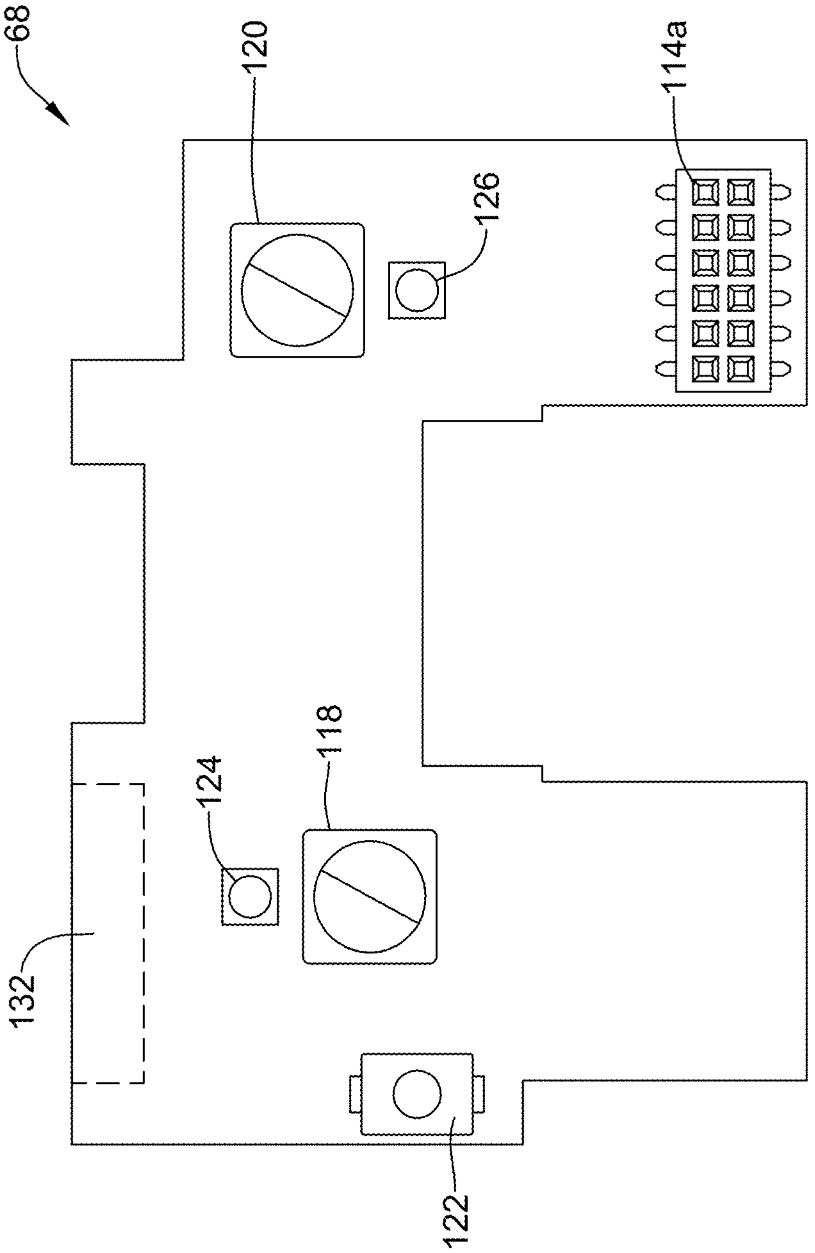
FIG. 7A is a front view and FIG. 7B is a back view of an illustrative user interface printed circuit board (PCB) forming part of the illustrative outlet socket of FIG. 4.
Figure 7B:
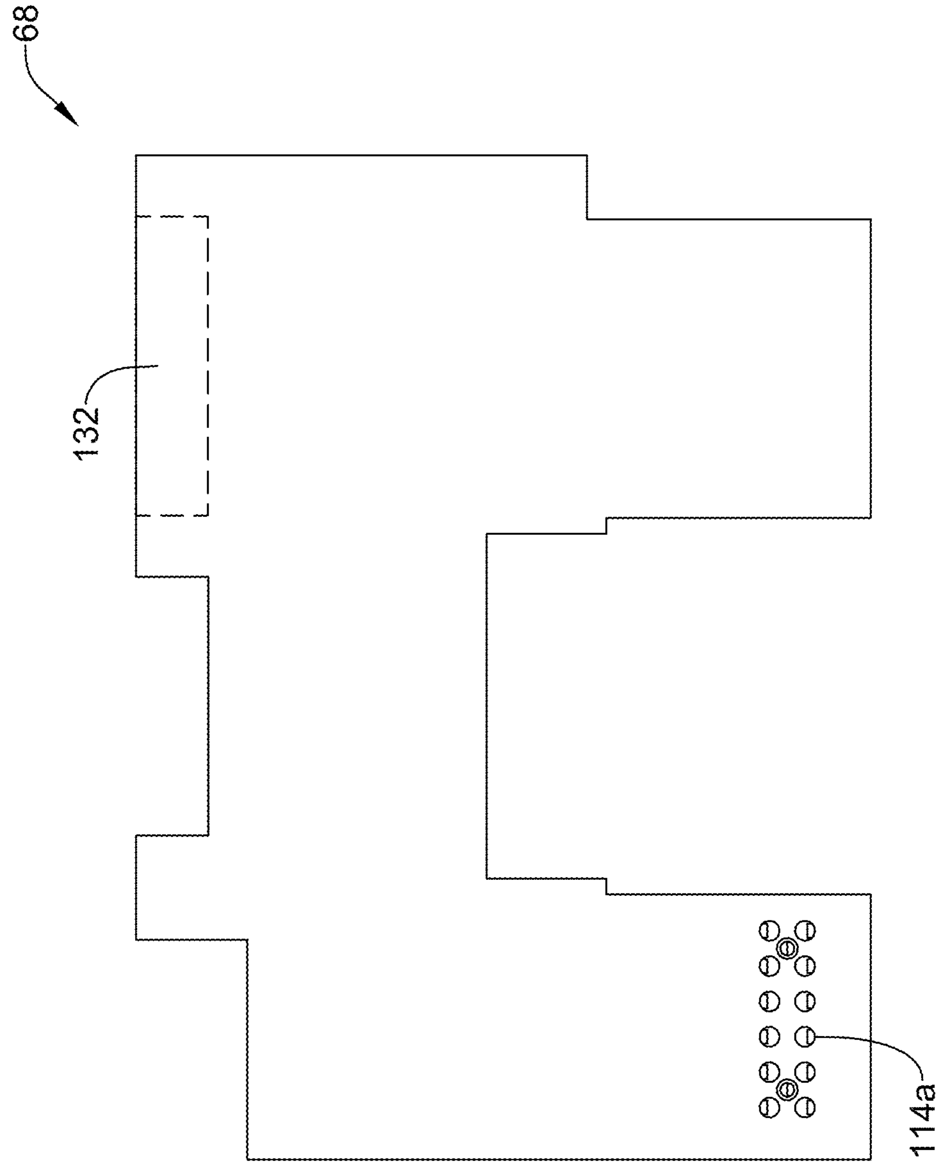
Figure 8:
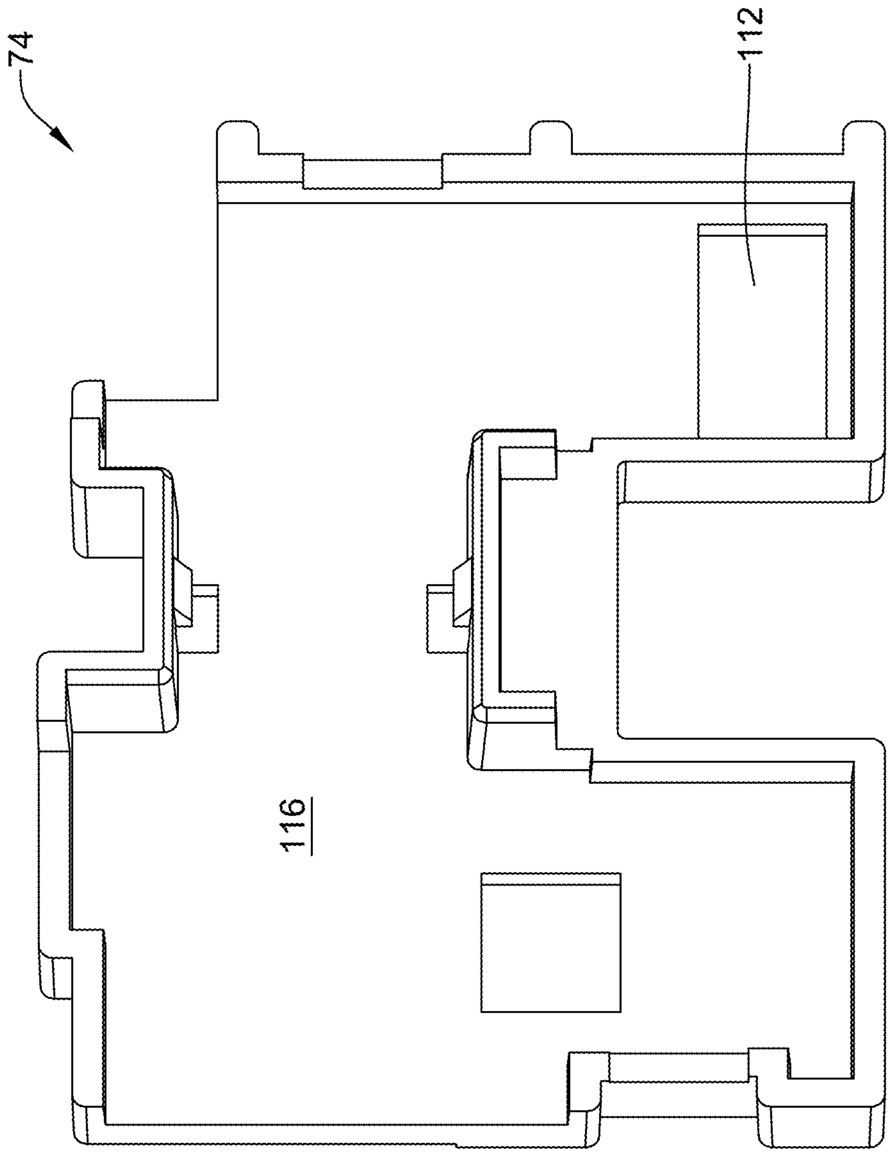
FIG. 8 is a perspective view of the front of an illustrative first spacer that is configured to be disposed behind the illustrative user interface PCB of FIGS. 7A and 7B.
Figure 9A:
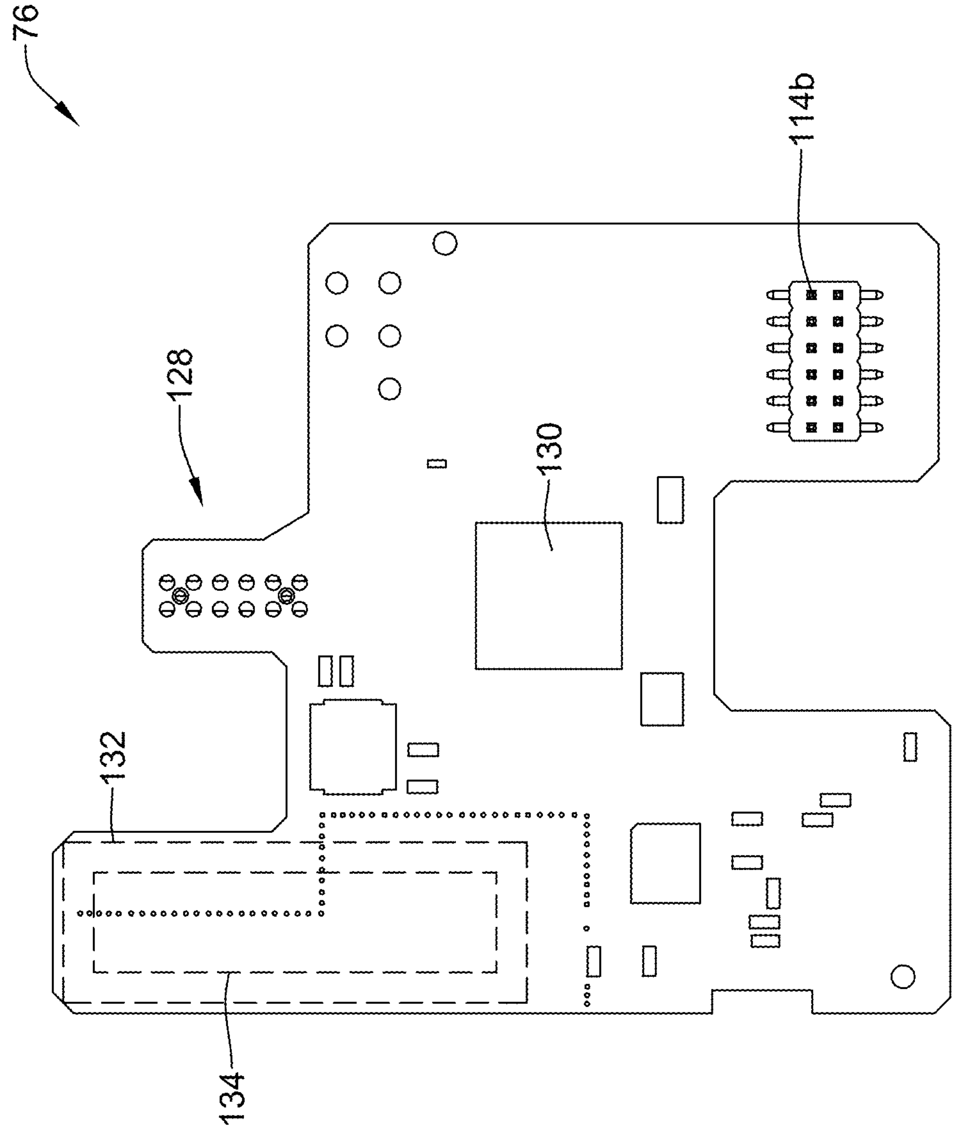
FIG. 9A is a front view and FIG. 9B is a back view of an illustrative communication PCB forming part of the illustrative outlet socket of FIG. 4.
Figure 9B:
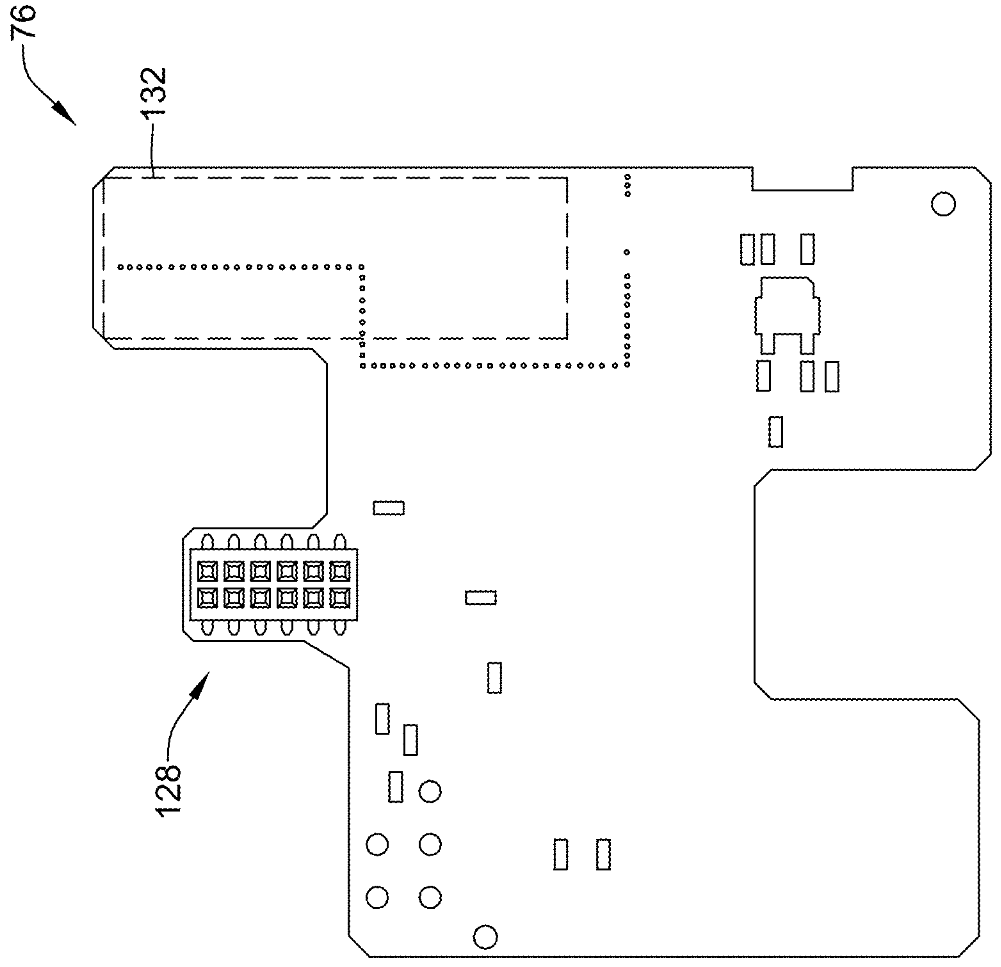
Figure 10:
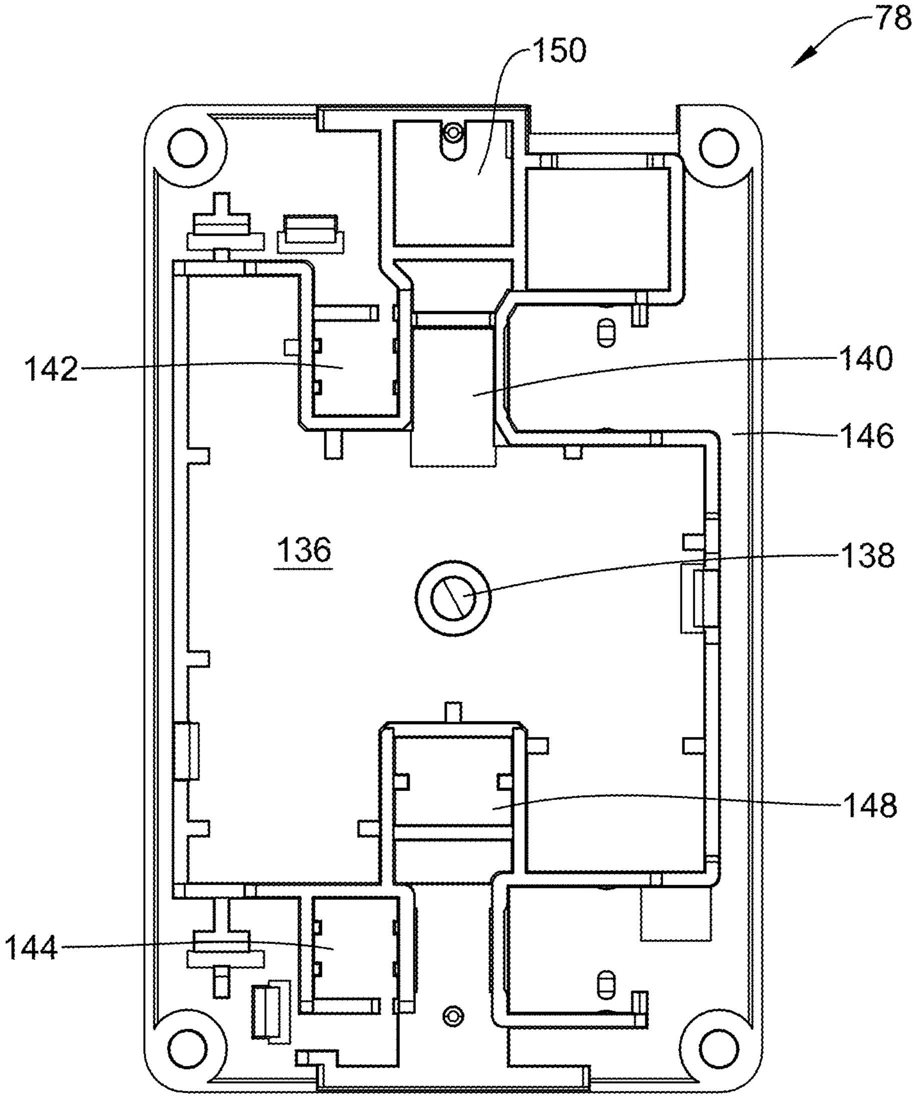
FIG. 10 is a front view of the front of an illustrative second spacer that is configured to be disposed behind the illustrative communication PCB of FIGS. 9A and 9B.
Figure 11A:
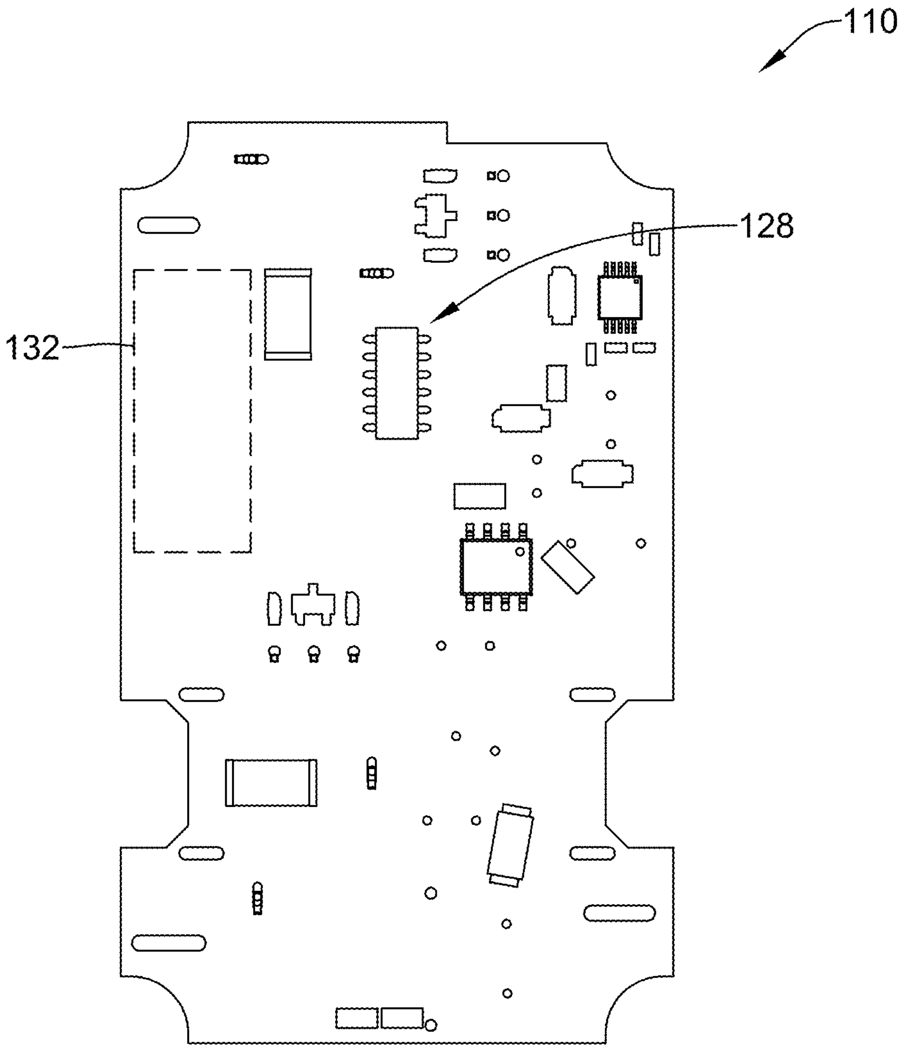
FIG. 11A is a front view and FIG. 11B is a back view of an illustrative power switching PCB forming part of the illustrative outlet socket of FIG. 4.
Figure 11B:
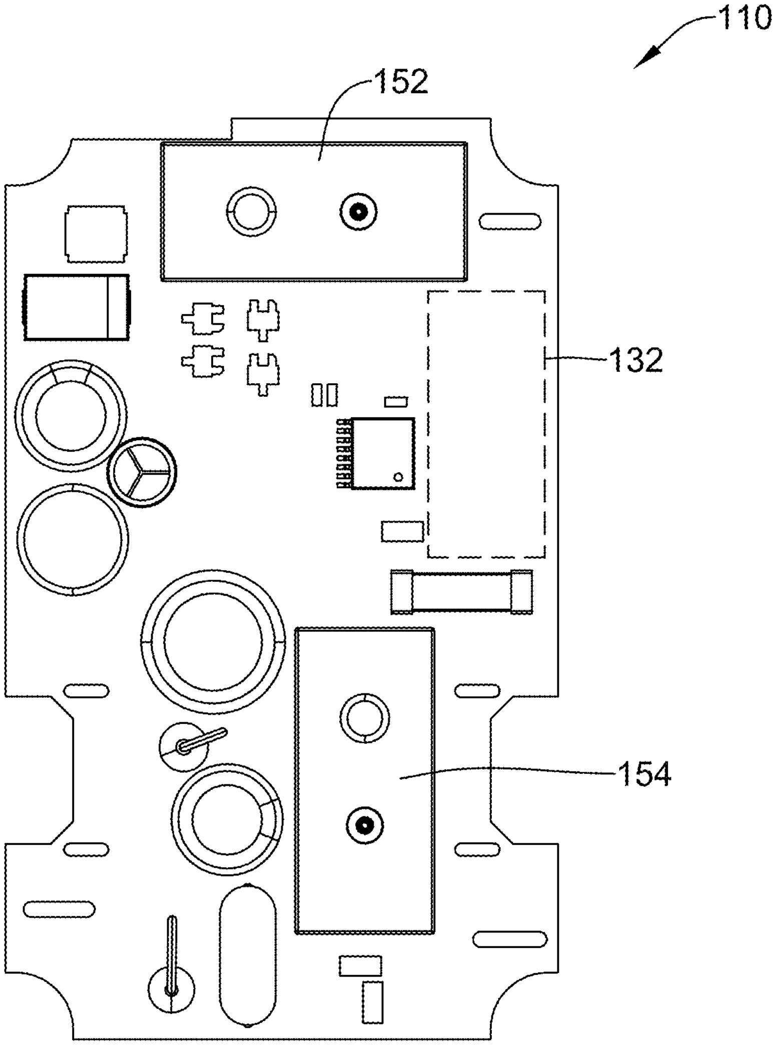

FIG. 6 is an exploded view showing some of the internal components of the outlet socket 10 (and 10*a*), including the previously noted user interface PCB 68, the first spacer 74, the communication PCB 76, the ground bracket 58 and the second spacer 78. FIG. 6 also shows a power switching PCB 110 that will be discussed in greater detail. FIGS. 7A and 7B are front and back views, respectively, of the user interface PCB 68. FIG. 8 is a perspective view of the first spacer 74 that sits behind the user interface PCB 68. FIGS. 9A and 9B are front and back views, respectively, of the communication PCB 76. FIG. 10 is a front view of the second spacer 78. FIGS. 11A and 11B are front and back views (relative to the front housing 16), respectively, of the power switching PCB 110.

The first spacer 74 includes an opening 112 that accommodates a first connector 114 that operatively couples the user interface PCB 68 with the communication PCB 76. As shown, the first connector 114 may be considered as including a female component 114*a* that is mounted to the user interface PCB 68 and a male component 114*b* that is mounted to the communication PCB 76. The first spacer 74 includes a recessed region 116 that is dimensioned to accommodate the user interface PCB 68 within the recessed region 116. The first spacer 74 may be formed of an electrically insulating material (i.e., not electrically conductive) and the first spacer 74 may not itself include any electrical or even electrically conductive components.

The user interface PCB 68 includes a first switch 118 that is actuatable by depressing the first button 36 and a second switch 120 that is actuatable by depressing the second button 40 (see FIG. 7A). The user interface PCB 68 includes a reset switch 122 that is actuatable by depressing the reset button 64. In some instances, the user interface PCB 68 includes a first LED 124 that may provide illumination for the first LED indicator 38 and a second LED 126 that may provide illumination for the second LED indicator 42. The first LED 124 and the second LED 126 may each be configured to output light of a single color. The first LED 124 and the second LED 126 may each include multiple LEDs, with each of the multiple LEDs configured to output light of a unique single color. In some cases, the first LED 124 and the second LED 126 may each be configured to output light in multiple colors, with each of the multiple colors selectable by a circuit driving the respective first LED 124 and second LED 126, for example.

The communication PCB 76 includes the male component 114*b* of the first connector 114 that operably couples the user interface PCB 68 with the communication PCB 76. The communication PCB 76 also includes a second connector 128 (see FIG. 9B) that operably couples the communication PCB 76 with the power switching PCB 110. As a result, electrical signals are able to pass between each of the user interface PCB 68, the communication PCB 76 and the power switching PCB 110. The communication PCB 76 includes a microcontroller 130 (see FIG. 9A). In some instances, the microcontroller 130 may be configured to control operation of the relays that selectively provide electrical power to the first female hot port 24 and the second female hot port 30. The microcontroller 130 may also regulate operation of the outlet socket 10 (and 10*a*) by monitoring an internal temperature of the outlet socket 10 (and 10*a*). The microcontroller 130 may also generally control most aspects of the smart outlet including the user interface PCB 68, wireless communication with a remote device and other functionality.

The communication PCB 76 includes a region 132 that does not include (i.e., is free of) any electrically conductive components and/or packaged electrical components. In some instances, as will be discussed, this region 132 (in three dimensions) may extended (project) in a first direction from the communication PCB 76 to the housing front 16 and may be extended (project) in an opposing second direction from the communication PCB 76 to the housing back 18 to define a three dimensional zone that is free of any electrically conductive components and/or packaged electrical components, other than an antenna 134. In some instances, the region 132 may be considered as being a packaged electrical component-free zone, meaning that the region 132 (and the space in front of the region 132 and the space behind the region 132) is free of any packaged electrical components. Examples of packaged electrical components include resistors, capacitors, inductors, relays, transistors and microcontrollers. In some instances, the communication PCB 76 includes an antenna 134 that is formed on the communication PCB 76 within the region 132. As an example, the region 132 may extend at least one (1) millimeter beyond a periphery of the antenna 134. The region 132 may overlap onto a portion of the user interface PCB 68.

FIG. 10 is a front view of the second spacer 78. The second spacer 78 may be formed of an electrically insulating material (i.e., not electrically conductive) and the second spacer 78 may not itself include any electrical or even electrically conductive components. The second spacer 78 includes a recessed area 136 that is dimensioned to accommodate the communication PCB 76 within the recessed area 136. In some instances, the recessed area 136 may include a stand-off 138 that holds the communication PCB 76 a short distance above a floor of the recessed area 136. In some instances, the second spacer 78 includes a recess 140 to accommodate the second connector 128 that operably couples the communication PCB 76 with the power switching PCB 110. The second spacer 78 also include walled areas that accommodate some of the line voltage components. A walled area 142 accommodates the first female hot terminal 80 while a walled area 144 accommodates the second female hot terminal 86. A walled area 146 accommodates the neutral conductive component 92, including the first female neutral terminal 82, the second female neutral terminal 88, and the conductive member 94 extending therebetween. A walled area 148 accommodates the second female ground terminal 90 while a walled area 150 accommodates the first female ground terminal 84, where the first female ground terminal 84 and the second female ground terminal 90 are part of the ground bracket 58. The ground bracket 58 is configured to extend between the first female ground terminal 84 and the second female ground terminal 90, and extends along a midline of the second spacer 78. Accordingly, the ground bracket 58 does not intrude on a zone created by extending the region 132 frontwards or backwards from the antenna 134.

The region 132 is also shown with respect to the power switching PCB 110 (FIG. 11A). As can be seen in the front view (actually the back of the power switching PCB 110) in FIG. 11A and the back view (actually the front of the power switching PCB 110) in FIG. 11B, there are no packaged electrical components (or ground plane) in the region 132 on either the front or back of the power switching PCB 110. The power switching PCB 110 includes a variety of electrical components, but none of them are disposed within the region 132. The power switching PCB 110 includes a first relay 152 that selectively provides (or does not provide) electrical power to the first female hot terminal 80 and a second relay 154 that selectively provides (or does not provide) electrical power to the second female hot terminal 86. In some cases, the first relay 152 supplies power to a first power plug (via the first outlet receptacle 20) when the first relay 152 is in a closed state and does not supply power to the first power plug (via the first outlet receptacle 20) when the first relay 152 is in an open state. In some cases, the second relay 154 supplies power to a second power plug (via the second outlet receptacle 22) when the second relay 154 is in a closed state and does not supply power to the second power plug (via the second outlet receptacle 22) when the second relay 154 is in an open state.

As can be seen, neither the first relay 152 nor the second relay 154 intrude into the region 132. Accordingly, the region 132, when extended (projected) to the front of the outlet socket 10 (or 10*a*) and to the back of the outlet socket 10 (or 10*a*) is free of packaged electrical components. In some instances, a portion of the user interface PCB 68 extends into the zone created by extending the region 132 frontwards and backwards, but that portion of the user interface PCB 68 (as seen in FIGS. 7A and 7B) does not include any packaged electrical components (or ground plane).

Figure 12A:
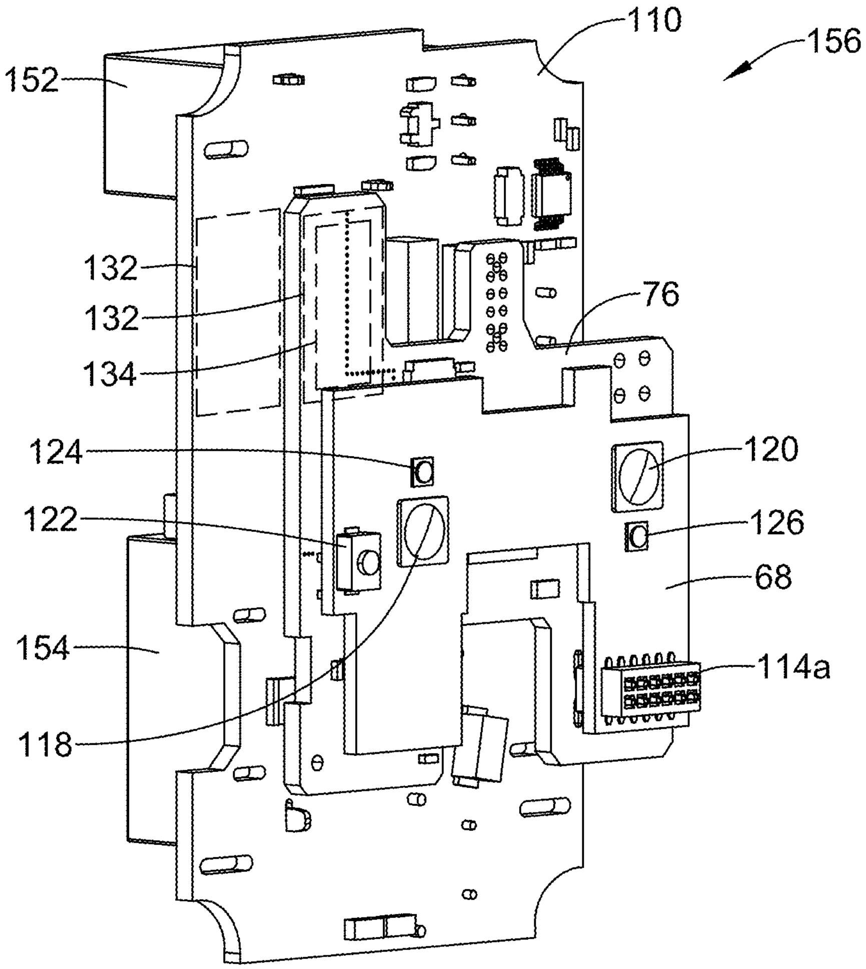
FIG. 12A is a front perspective view and FIG. 12B is a rear perspective view of the illustrative user interface PCB of FIGS. 7A and 7B, the illustrative communication PCB of FIGS. 9A and 9B, and the illustrative power switching PCB of FIGS. 11A and 11B, showing the relative arrangement of the three PCBS within the illustrative outlet socket of FIG. 4.
Figure 12B:
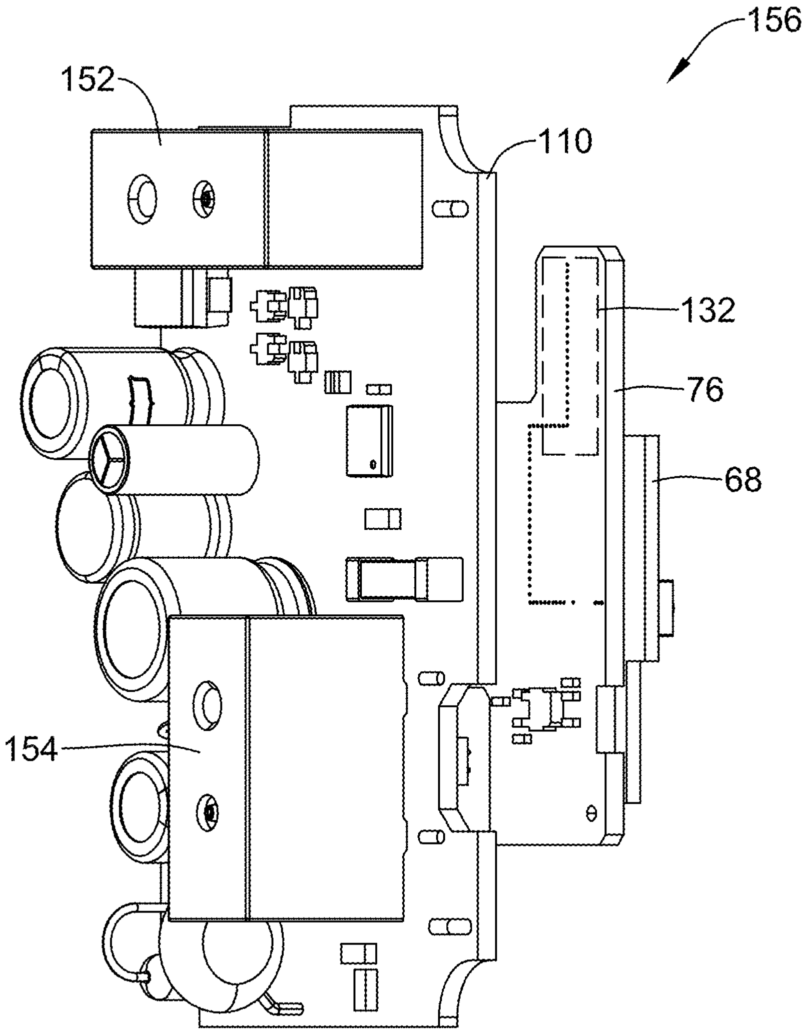

FIG. 12A is a front perspective view and FIG. 12B is a back perspective view of a PCB assembly 156 that includes the user interface PCB 68, the communication PCB 76 and the power switching PCB 110, showing how the user interface PCB 68, the communication PCB 76 and the power switching PCB 110 are spatially arranged with respect to each other within the outlet socket 10 (or 10*a*). FIGS. 12A and 12B show how the region 132 may be expanded (projected) frontwards and backwards onto each of the user interface PCB 68, the communication PCB 76 and the power switching PCB 110 to show how the antenna 134 is disposed within a packaged electronics-free zone. Further details regarding the antenna 134 will be discussed with respect to subsequent drawings.

Figure 13:
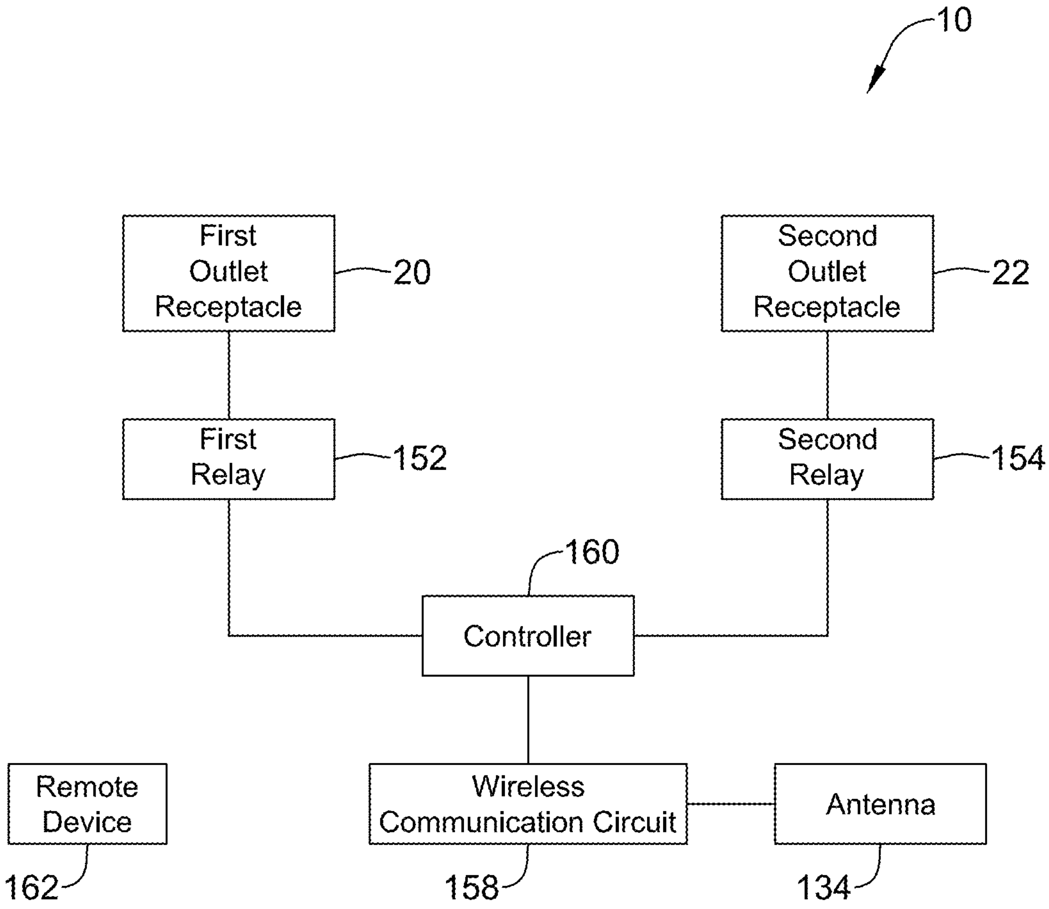
FIG. 13 is a schematic block diagram showing an illustrative outlet socket.

FIG. 13 is a schematic block diagram of the outlet socket 10 (or 10*a*). As can be seen, the outlet socket 10 (or 10*a*) includes a wireless communication circuit 158. A controller 160, which may be considered as being an example of the microcontroller 130, is operatively coupled to the first relay 152, the second relay 154 and the wireless communication circuit 158. The controller 160 is configured to communicate with one or more remote devices 162 via the wireless communication circuit 158 and the antenna 134. The controller 160 is also configured to control the state of the first relay 152 and the second relay 154. In some instances, the controller 160 may provide one or more control signals to the power switching PCB 110 via the second connector 128 to selectively turn power on and turn power off to the female outlet receptacles 20, 22. In some instances, the controller 160 may receive input signals from the user interface PCB 68 via the first connector 114 and uses the input signals to determine whether to turn power on and turn power off to the female outlet receptacles 20, 22. In some cases, the controller 160 may provide one or more control signals to the user interface PCB 68 via the first connector 114, and the user interface PCB 68 uses the one or more control signals from the communication PCB 76 to control at least one of the one or more user interface components 166. The user interface components 166 may include buttons such as the first button 36 and/or the second button 40, or LED indicators such as the first LED indicator 38 and/or the second LED indicator 42.

Figure 14:
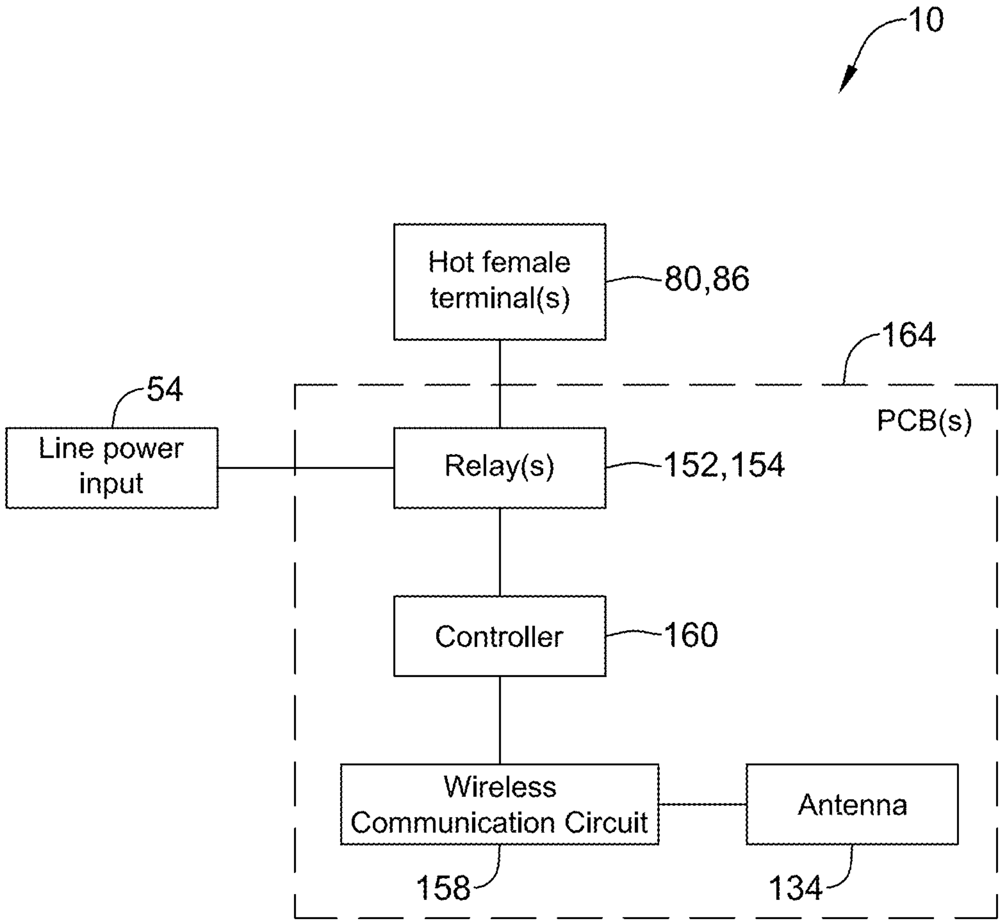
FIG. 14 is a schematic block diagram showing an illustrative outlet socket.

FIG. 14 is a schematic block diagram of the outlet socket 10 (or 10*a*). The outlet socket 10 (or 10*a*) includes one or more printed circuit boards 164 that includes several different components. The one or more printed circuit boards 164 may include one or more of the user interface PCB 68, the communication PCB 76 and/or the power switching PCB 110, for example. The one or more printed circuit boards 164 may include the relay(s) 152, 154 that electrically connect the hot female terminal(s) 80, 86 to the hot input 54 when the relay(s) 152, 154 are in a closed state and electrically disconnect the hot female terminals(s) 80, 86 from the hot input 54 when the relay(s) 152, 154 are in a closed state.

In some cases, the one or more printed circuit boards 164 may extend into the packaged electrical component-free zone indicated by the region 132 but are free from any packaged electrical component mounted to the one or more printed circuit boards 164 in the packaged electrical component-free zone. In some instances, any portion of the one or more printed circuit boards 164 that extend into the packaged electrical component-free zone do not have a ground plane extending into the packaged electrical component-free zone. The relay(s) 152 and 154 are mounted to the one or more printed circuit boards 164, but do not extend into the packaged electrical component-free zone. Each of the line voltage components that electrically connect to the hot female terminal(s) 80, 86, the neutral female terminals 82 and 88 and to the ground female terminals 84 and 90 are routed within the outlet socket 10 so as to avoid the packaged electrical component-free zone.

Figure 15:
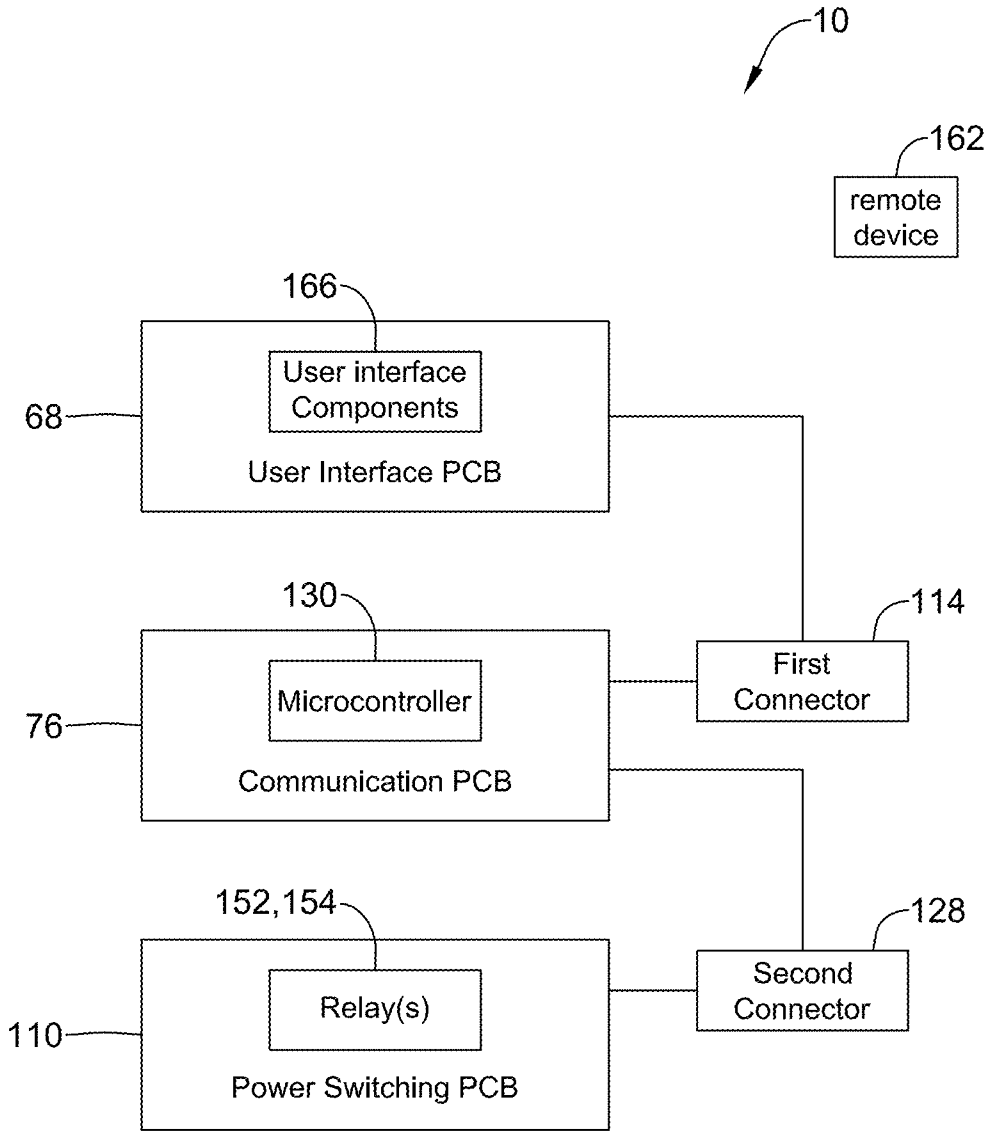
FIG. 15 is a schematic block diagram showing an illustrative outlet socket.

In some cases, the outlet socket 10 (and 10*a*) is configured to be able to be opened in the field in order to change the functionality of the outlet socket 10 (and 10*a*). FIG. 15 is a schematic view of the outlet socket 10 (or 10*a*) showing a number of stacked printed circuit boards including the user interface PCB 68, the communication PCB 76 and the power switching PCB 110. In some cases, the housing 14 (FIG. 1) may be releasably opened in the field (e.g. via screws), and one or more of the user interface PCB 68, the communication PCB 76 and the power switching PCB 110 may be swapped out with different boards having different functionality, and thus are configured to be replaceable in the field. For example, the user interface PCB 68 may be swapped out in order to change the user interface components 166. The communication PCB 76 may be swapped out in order to change from a communication PCB 76 that is configured to wirelessly communicate using a first wireless communications protocol (e.g. WiFi) to change to a replacement communication PCB 76 that is configured to wirelessly communicate via a second wireless communications protocol (e.g. Bluetooth) that is different from the first wireless communications protocol. The power switching PCB 110 may be swapped out for a replacement power switching PCB that does not include relays, for example, or to accommodate relays with a different power rating.

Figure 16:
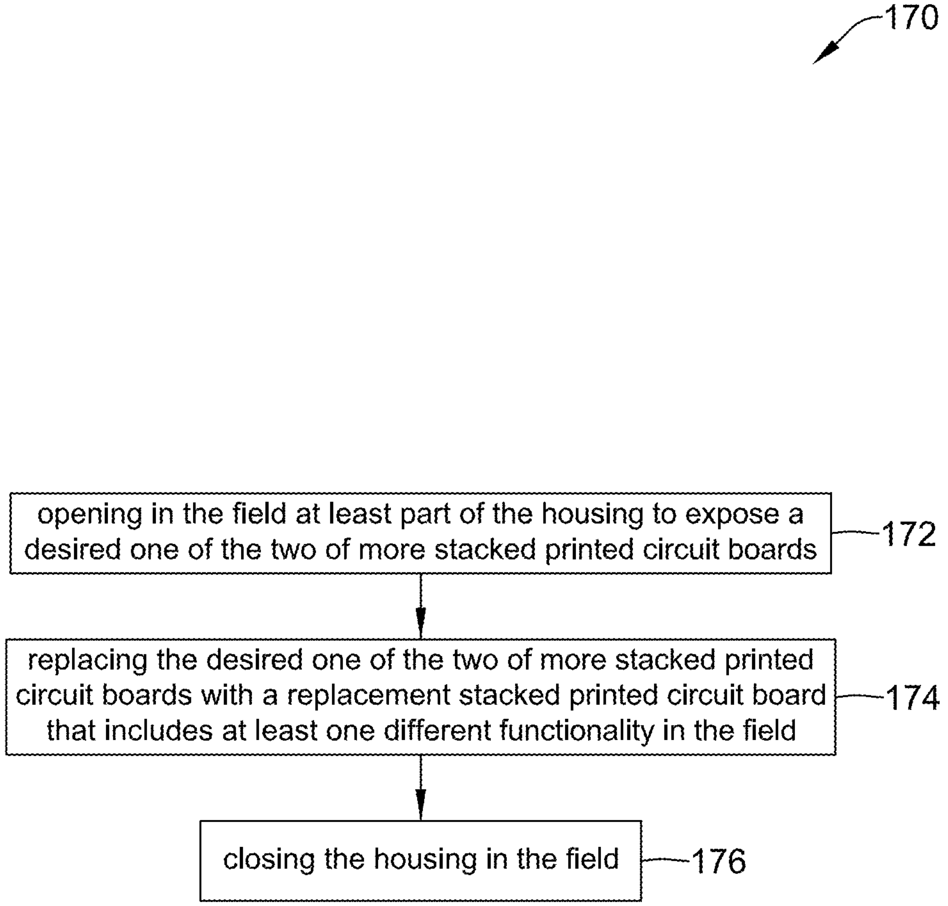
FIG. 16 is a flow diagram showing an illustrative method of changing the function of an outlet socket in the field.

FIG. 16 is a flow diagram showing an illustrative method 170 of changing a function of an outlet socket (such as the outlet socket 10 or 10*a*) in the field. The method 170 includes opening in the field at least part of the housing (such as the housing 14) to expose a desired one of the two of more stacked printed circuit boards (such as the user interface PCB 68, the communication PCB 76 and/or the power switching PCB 110), as indicated at block 172. In some instances, opening the housing 14 includes removing one or more removable screws or other fasteners. The desired one of the two of more stacked printed circuit boards is replaced in the field with a replacement stacked printed circuit board that includes at least one different functionality, as indicated at block 174. The housing is closed in the field, as indicated at block 176. In some cases, closing the housing in the field includes reinstalling the one or more screws or other fasteners.

In some instances, the desired one of the two of more stacked printed circuit boards selectively turns power on and power off to the female socket receptacle in accordance with a first maximum current load (e.g. 10 amperes), and the replacement stacked printed circuit board selectively turns power on and power off to the female socket receptacle in accordance with a second maximum current load (e.g. 20 amperes), wherein the second maximum current load is different from the first maximum current load. In some instances, one of the two or more stacked printed circuit boards interfaces with one or more user interface components, and the method includes replacing one or more user interface components with one or more replacement user interface components, where the desired one of the two of more stacked printed circuit boards interfaces with the one or more user interface components, and the replacement stacked printed circuit board interfaces with the one or more replacement user interface components.

Figure 17:
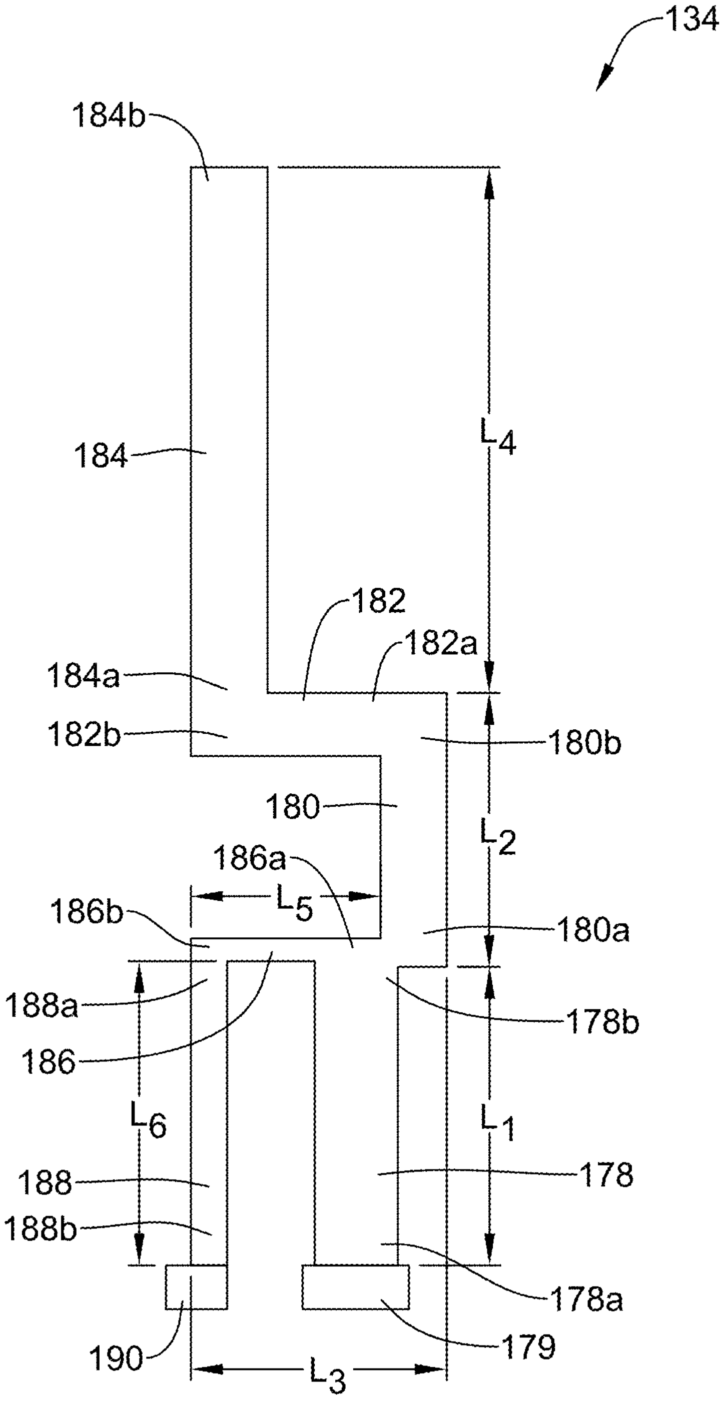
FIG. 17 is a schematic view of an illustrative antenna forming part of the illustrative outlet socket of FIG. 4, the illustrative antenna configured to be disposed on the illustrative communication PCB of FIGS. 9A and 9B within a packaged electrical component-free zone extending both behind and in front of the illustrative antenna.

FIG. 17 is a schematic view of the antenna 134. In some instances, the antenna 134 may be considered as being a printed circuit board-implemented antenna in which the antenna 134 is formed from conductive traces on a printed circuit board. In some cases, the antenna 134 may be formed on or within one of the plurality of printed circuit boards 164. In some instances, the antenna 134 may be formed on the communication PCB 76, for example. In some cases, the antenna 134 may be tuned for use with a particular frequency. As an example, the antenna 134 may be tuned for use with a frequency of about 2.4 GHz, which corresponds to Bluetooth. In some cases, the antenna 134 may have a return loss of less then −10 dB at 2.4 GHz. In some cases, the antenna 134 may have a return loss of less then −10 dB across the frequency range of 2.1 GHZ-2.6 GHz. The antenna 134 may be positioned within the outlet socket 10 (and 10*a*) such that the antenna 134 is laterally offset from the ground bracket 58.

The illustrative antenna 134 includes a first antenna leg 178 supported by a printed circuit board, the first antenna leg 178 having a length $L_1$ and a width orthogonal to the length $L_1$. A first end region 178*a* of the first antenna leg 178 is operatively connected to an antenna signal trace 179 of the printed circuit board, and a second end region 178*b* of the first antenna leg 178 extends away from the first end region 178*a* of the first antenna leg 178 in a first direction. The antenna 134 includes a second antenna leg 180 supported by the printed circuit board, the second antenna leg 180 having a length $L_2$ and a width orthogonal to the length $L_2$. A first end region 180*a* of the second antenna leg 180 is connected to the second end region 178*b* of the first antenna leg 178, and a second end region 180*b* of the second antenna leg 180 extends away from the first end region 180*a* of the second antenna leg 180 in the first direction, wherein a centerline along the length of the second antenna leg 180 is laterally offset from a centerline along the length of the first antenna leg 178. The antenna 134 includes a third antenna leg 182 supported by the printed circuit board, the third antenna leg 182 having a length $L_3$ and a width orthogonal to the length $L_3$. A first end region 182*a* of the third antenna leg 182 is connected to the second end region 180*b* of the second antenna leg 180, and a second end region 182*b* of the third antenna leg 182 extends away from the first end region 182*a* of the third antenna leg 182 in a second direction that is orthogonal to the first direction. The antenna 134 includes a fourth antenna leg 184 supported by the printed circuit board, the fourth antenna leg 184 having a length $L_4$ and a width orthogonal to the length $L_4$. A first end region 184*a* of the fourth antenna leg 184 is connected to the second end region 182*b* of the third antenna leg 182, and a second end region 184*b* of the fourth antenna leg 184 extends away from the first end region 184*a* of the fourth antenna leg 184 in the first direction. The antenna 134 includes a fifth antenna leg 186 supported by the printed circuit board, the fifth antenna leg having a length $L_5$ and a width orthogonal to the length $L_5$. A first end region 186*a* of the fifth antenna leg 186 is connected to the second end region 178*b* of the first antenna leg 178, and a second end region 186*b* of the fifth antenna leg 186 extends away from the first end region 186*a* of the fifth antenna leg 186 in the second direction that is orthogonal to the first direction. The antenna 134 includes a sixth antenna leg 188 supported by the printed circuit board, the sixth antenna leg 188 having a length $L_6$ and a width orthogonal to the length $L_6$. A first end region 188*a* of the sixth antenna leg 188 is connected to the second end region 186*b* of the fifth antenna leg 186, and a second end region 188*b* of the sixth antenna leg 188 extending away from the first end region 188*a* of the sixth antenna leg 188 in a direction opposite to the first direction and operatively connected to a ground plane 190 of the printed circuit board.

In some instances, the length $L_2$ of the second antenna leg 180 may be shorter than the length $L_1$ of the first antenna leg 178. In some instances, the length $L_4$ of the fourth antenna leg 184 may be longer than the lengths $L_1$, $L_2$, $L_3$, respectively, of each of the first antenna leg 178, the second antenna leg 180 and the third antenna leg 182. In some cases, the width of the second antenna leg may be less than the width of the first antenna leg 178. In some cases, the width of the sixth antenna leg 188 may be less than the width of each of the first antenna leg 178, the second antenna leg 180, the third antenna leg 182 and the fourth antenna leg 184.

In some instances, the first antenna leg 178 may have a length $L_1$ that is about 5 millimeters and a width of about 1.25 millimeters. The term "about" may refer to a dimension being within plus/minus 20 percent. As an example, the first antenna leg 178 may have a length $L_1$ that ranges from 4 millimeters to 6 millimeters, and a width that ranges from 1 millimeter to 1.5 millimeters. The second antenna leg 180 may have a length $L_2$ of about 4 millimeters and a width of about 1 millimeter. The third antenna leg 182 may have a length $L_3$ of about 2 millimeters and a width of about 1 millimeter. The fourth antenna leg 184 may have a length $L_4$ of about 10 millimeters and a width of about 1 millimeter. The fifth antenna leg 186 may have a length $L_5$ of about 4 millimeters and a width of about 0.4 millimeter. The sixth antenna leg 188 may have a length $L_6$ of about 5 millimeters and a width of about 0.4 millimeter. These are just examples.

In some cases, the antenna 134, including the first antenna leg 178, the second antenna leg 180, the third antenna leg 182, the fourth antenna leg 184, the fifth antenna leg 186 and the sixth antenna leg 188, may collectively fit within a rectangular area on the printed circuit board of less than 80 square millimeters. As an example, the antenna 134 may fit within a rectangular area that is about 20 millimeters by about 4 millimeters. In some cases, the rectangular area of the printed circuit board that the antenna 134, including the first antenna leg 178, the second antenna leg 180, the third antenna leg 182, the fourth antenna leg 184, the fifth antenna leg 186 and the sixth antenna leg 188, fits into may be free from a ground plane. In some instances, the first antenna leg 178, the second antenna leg 180, the third antenna leg 182, the fourth antenna leg 184, the fifth antenna leg 186 and the sixth antenna leg 188 may each be formed from metal traces of the printed circuit board. In some cases, the metal traces forming the legs of the antenna may be formed on a single metal layer of the printed circuit board. In some cases, the metal traces forming the legs of the antenna may be formed on two or more metal layers of the printed circuit board interconnected by one or more VIAS.

In some instances, the antenna 134 may be considered as including a plurality of antenna legs that are each formed using one or more metal layers of the printed circuit board. The plurality of antenna legs may include two parallel extending antenna segments supported by the printed circuit board (e.g. the first antenna leg 178 and the sixth antenna leg 188). The ends of the two parallel extending antenna segments are operatively connected via an interconnecting segment (the fifth antenna leg 186). The plurality of antenna legs include an antenna tail that is operatively coupled to the interconnecting segment (the fifth antenna leg 186), wherein the tail has an overall length that is at least twice as long as the first one of the two parallel extending antenna segments and at least twice as long as the second one of the two parallel extending antenna segments. In the example of FIG. 17, the antenna tail encompasses the second antenna leg 180, the third antenna leg 182 and the fourth antenna leg 184.

Figure 18A:
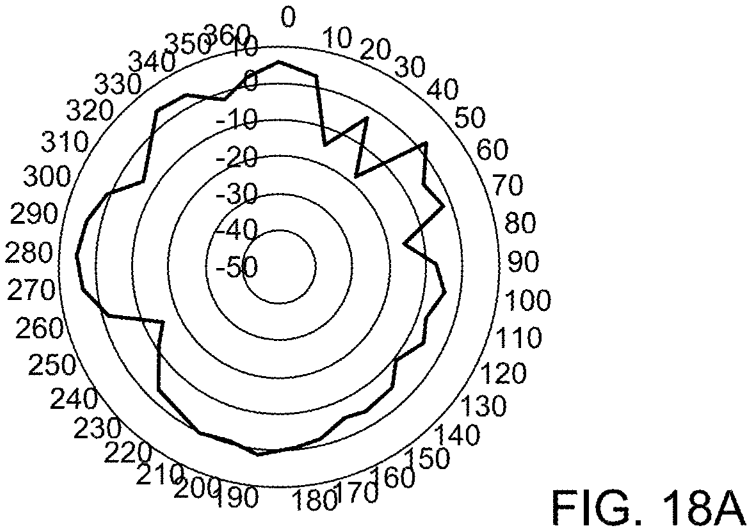
FIGS. 18A and 18B are graphs providing simulated effective received power values with calibration factor and constant elevation (FIG. 18A) and constant azimuth (FIG. 18B)
Figure 18B:
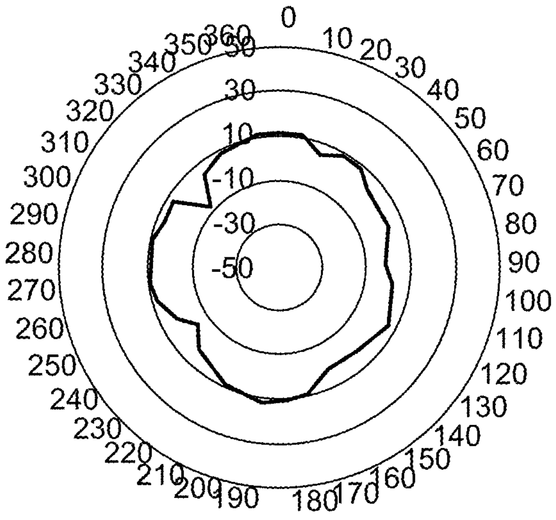

FIGS. 18A and 18B are graphs providing simulated effective received power values with calibration factor and constant elevation (FIG. 18A) and constant azimuth (FIG. 18B) for the antenna 134. FIGS. 18A and 18B both illustrate good performance for the antenna 134 at all angles.

Figure 19:
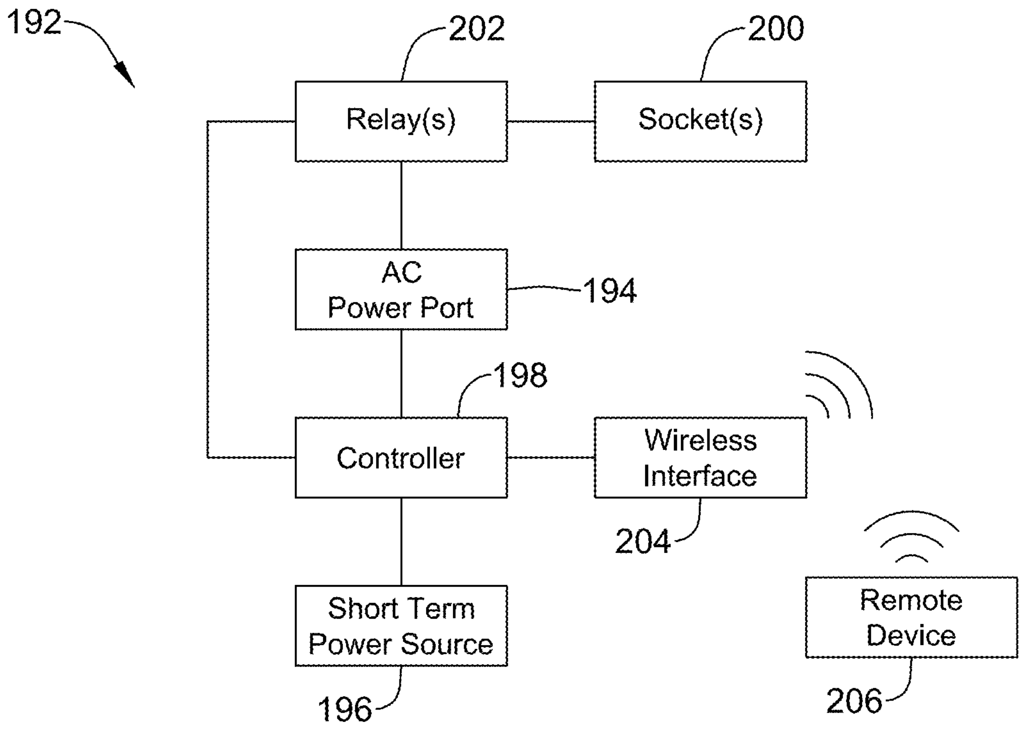
FIG. 19 is a schematic block diagram showing an illustrative circuit forming part of the illustrative outlet sockets described herein.

FIG. 19 is a schematic block diagram showing an illustrative circuit 192 that may be incorporated into the outlet socket 10 (or 10*a*) for monitoring for power losses within the power supply to the outlet socket 10. The circuit 192 may be incorporated into one of the one or more printed circuit boards 164, for example. The circuit 192 includes an AC power port 194 for receiving AC power to power the circuit 192. The AC power may have an expected amplitude, expected frequency and an expected period of 1/frequency. For example, the AC power may have an expected amplitude of 120 Volts, an expected frequency of 60 Hertz and expected period of 16 milliseconds. In another example, the AC power may have an expected amplitude of 220 Volts, an expected frequency of 50 Hertz and expected period of 20 milliseconds. The circuit 192 includes a short-term power source 196 for maintaining power to the circuit 192 for a shutdown period of time following a loss of AC power. As an example, the short-term power source 196 may be a capacitor, battery and/or other short-term power supply. A controller 198 is operatively coupled to the AC power port 194 and the short-term power source 196. In some cases, the circuit 192 may also include one or more sockets 200 to plug in one or more components, one or more relays 202 for controlling AC power to the one or more sockets 200, and a wireless interface 204 for communicating wireless messages with a remote device 206.

The controller 198 is configured to detect zero-crossings of the AC power (i.e. amplitude of the voltage of the AC power) at the AC power port 194 and to determine a zero-crossing count of zero-crossings that are detected over a count period of time, wherein the count period of time has a duration that covers a multiple "n" of the expected period of the AC power, where "n" is a positive integer. In some cased, the multiple "n" may be programmable, and may be greater 1. In some cases, the multiple "n" may be made larger when the short-term power supply of the outlet socket 10 is larger thereby providing a longer shutdown period of time following a loss of AC power. A larger value of "n" may reduce AC power loss false detections relative to using a smaller value of "n".

The controller 198 is configured to determine when the zero-crossing count is less than an expected zero-crossing count over the count period of time, wherein the expected zero-crossing count corresponds to a number of zero-crossings that are expected to occur over the count period of time assuming the AC power is not lost. In some cases, the controller 198 may be configured to detect just positive (or negative) zero-crossings, and the expected zero-crossing count may correspond to the number of positive (or negative) zero-crossings that are expected to occur over the count period of time assuming the AC power is not lost. In some cases, the controller 198 may be configured to detect both positive and negative zero-crossings, and the expected zero-crossing count may correspond to the number of positive and negative zero-crossings that are expected to occur over the count period of time assuming the AC power is not lost.

When the zero-crossing count is less than the expected zero-crossing count over the count period of time, the controller 198 is configured to compare the amplitude of the AC power to the expected amplitude (i.e. the expected amplitude of the voltage of the AC power). When the amplitude of the AC power is less than the expected amplitude by at least a threshold margin (e.g. amplitude of the AC power is less than 80% of the expected amplitude), the controller 198 is configured to perform one or more shut down actions during the shutdown period of time to prepare the circuit 192 for loss of AC power. The one or more shut down actions may include one or more of saving the current state, settings and/or operating parameters of the circuit 192 to a non-volatile memory, sending an alarm to the remote device 206 via the wireless interface 204, and closing and/or opening the one or more relays 202. When the amplitude of the AC power is not less than the expected amplitude by at least the threshold margin (e.g. amplitude of the AC power is less than 80% of the expected amplitude), the controller 198 is configured to reset the zero-crossing count to zero. When the zero-crossing count is not less than the expected zero-crossing count over the count period of time, the controller 198 is configured to reset the zero-crossing count to zero.

Figure 20:
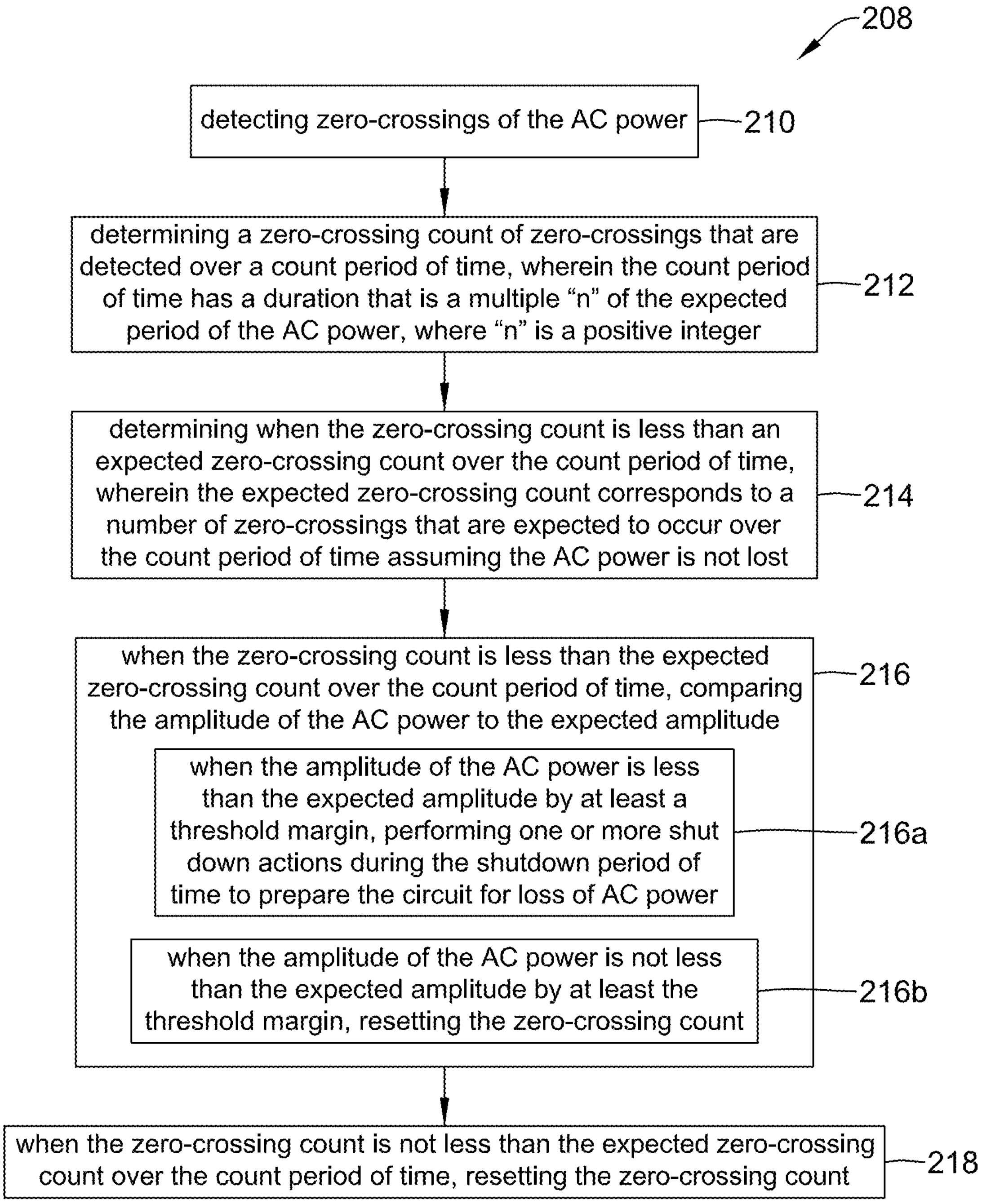
FIG. 20 is a flow diagram showing an illustrative method of detecting power loss in the illustrative circuit of FIG. 19.

FIG. 20 is a flow diagram showing an illustrative method 208 for detecting a power loss of AC power to a circuit (such as the circuit 192), wherein the circuit includes a short-term power source (such as the short-term power source 196) for maintaining power to the circuit for a shutdown period of time following the power loss of AC power, the AC power having an expected amplitude, expected frequency and an expected period of 1/frequency. The method includes detecting zero-crossings of the AC power, as indicated at block 210. In some cases, this includes detecting both positive and negative zero-crossings. In some cases, this includes detecting just positive or negative zero-crossings. A determination is made as to a zero-crossing count of zero-crossings that are detected over a count period of time, wherein the count period of time has a duration that covers a multiple “n” of the expected period of the AC power, where “n” is a positive integer, as indicated at block 212. In some instances, the count period of time may be offset so as to begin between two successive expected zero-crossings of the AC power assuming the power was not lost. As an example, the multiple “n” may be programmable, and may be greater 1. In some cases, the multiple “n” may be made larger when the short-term power supply (e.g. short-term power source 196) of the circuit (e.g. circuit 192) is larger thereby providing a longer shutdown period of time following a loss of AC power. A larger value of “n” may reduce AC power loss false detections relative to using a smaller value of “n”.

A determination is made as to when the zero-crossing count is less than an expected zero-crossing count over the count period of time, wherein the expected zero-crossing count corresponds to a number of zero-crossings that are expected to occur over the count period of time assuming the AC power is not lost, as indicated at block 214. In some cases, the expected zero-crossing count may correspond to the number of positive (or negative) zero-crossings that are expected to occur over the count period of time assuming the AC power is not lost. In some cases, the expected zero-crossing count may correspond to the number of positive and negative zero-crossings that are expected to occur over the count period of time assuming the AC power is not lost.

When the zero-crossing count is less than the expected zero-crossing count over the count period of time (sometimes by threshold margin), the amplitude of the AC power (e.g. the amplitude of the voltage of the AC power) is compared to the expected amplitude of the AC power, as indicated at block 216. Moreover, when the amplitude of the AC power is less than the expected amplitude by at least a threshold margin, one or more shut down actions are performed during the shutdown period of time to prepare the circuit for loss of AC power, as indicated at block **216*a*. The one or more shut down actions may include one or more of saving the current state, settings and/or operating parameters of the circuit to a non-volatile memory, sending an alarm, and closing and/or opening one or more relays. Moreover, when the amplitude of the AC power is not less than the expected amplitude by at least the threshold margin, the zero-crossing count is reset to zero, as indicated at block 216*b***.

When the zero-crossing count is not less than the expected zero-crossing count over the count period of time, the zero-crossing count is reset to zero, as indicated at block 218. In some instances, detecting zero-crossings of the AC power may include issuing a zero-crossing interrupt for each detected zero-crossing, and determining the zero-crossing count of the zero-crossings that are detected over the count period of time may include counting the zero-crossing interrupts that are issued over the count period of time. In some cases, the method 208 may include issuing count period interrupts at a period that corresponds to the multiple “n” of the expected period of the AC power, wherein the count period of time is defined between two successive count period interrupts. In some cases, the interrupts are generated by Energy Management Device HLW8112 commercially available from HiLiwi technology.

Figure 21:
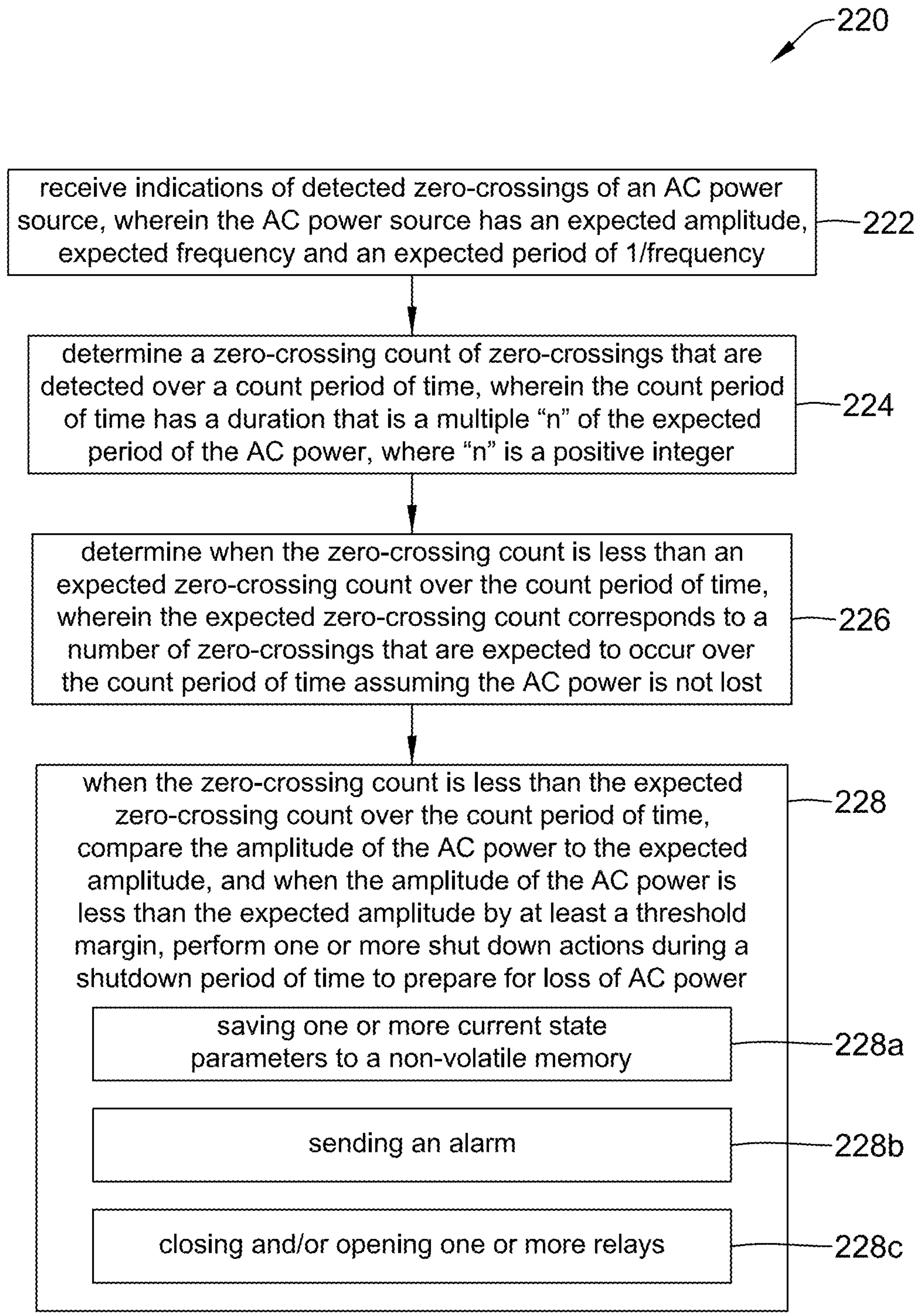
FIG. 21 is a flow diagram showing an illustrative series of steps that may be carried out by one or more processors executing executable instructions.

FIG. 21 is a flow diagram showing an illustrative series of steps 220 that may be carried out by one or more processors executing executable instructions. The one or more processors may be part of a controller (e.g. controller 198), for example. The one or more processors may be caused to receive indications of detected zero-crossings of an AC power source, wherein the AC power source has an expected amplitude, expected frequency and an expected period of 1/frequency, as indicated at block 222. The indications of detected zero-crossings of the AC power source may be provided by Energy Management Device HLW8112 commercially available from HiLiwi technology or any other suitable circuit or device. The one or more processors may be caused to determine a zero-crossing count of zero-crossings that are detected over a count period of time, wherein the count period of time has a duration that covers a multiple “n” of the expected period of the AC power, where “n” is a positive integer, as indicated at block 224. In some cased, the multiple “n” may be programmable.

The one or more processors may be caused to determine when the zero-crossing count is less than an expected zero-crossing count over the count period of time, wherein the expected zero-crossing count corresponds to a number of zero-crossings that are expected to occur over the count period of time assuming the AC power is not lost, as indicated at block 226. When the zero-crossing count is less than the expected zero-crossing count over the count period of time, the one or more processors may be caused to compare the amplitude of the AC power to the expected amplitude, and when the amplitude of the AC power is less than the expected amplitude by at least a threshold margin, the one or more processors may be caused to perform one or more shut down actions during a shutdown period of time to prepare for loss of AC power, as indicated at block 228. The one or more shutdown actions may include saving the state, settings and/or operating parameters to a non-volatile memory, as indicated at block **228*a*. The one or more shutdown actions may include sending an alarm, as indicated at block 228*b*. The one or more shutdown actions may include closing and/or opening one or more relays, as indicated at block 228*c***. When the amplitude of the AC power is not less than the expected amplitude by at least the threshold margin, the one or more processors may be caused to reset the zero-crossing count to zero. When the zero-crossing count is not less than the expected zero-crossing count over the count period of time, the one or more processors may be caused to reset the zero-crossing count to zero.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A printed circuit board implemented antenna, comprising:

a first antenna leg supported by a printed circuit board, the first antenna leg having a length and a width, with a first end region of the first antenna leg operatively connected to an antenna signal trace of the printed circuit board and a second end region of the first antenna leg extending away from the first end region of the first antenna leg in a first direction;

a second antenna leg supported by the printed circuit board, the second antenna leg having a length and a width, with a first end region of the second antenna leg connected to the second end region of the first antenna leg, and with a second end region of the second antenna leg extending away from the first end region of the second antenna leg in the first direction, wherein a centerline along the length of the second antenna leg is laterally offset from a centerline along the length of the first antenna leg;

a third antenna leg supported by the printed circuit board, the third antenna leg having a length and a width, with a first end region of the third antenna leg connected to the second end region of the second antenna leg, and with a second end region of the third antenna leg extending away from the first end region of the third antenna leg in a second direction that is orthogonal to the first direction;

a fourth antenna leg supported by the printed circuit board, the fourth antenna leg having a length and a width, with a first end region of the fourth antenna leg connected to the second end region of the third antenna leg, and with a second end region of the fourth antenna leg extending away from the first end region of the fourth antenna leg in the first direction;

a fifth antenna leg supported by the printed circuit board, the fifth antenna leg having a length and a width, with a first end region of the fifth antenna leg connected to the second end region of the first antenna leg, and with a second end region of the fifth antenna leg extending away from the first end region of the fifth antenna leg in the second direction that is orthogonal to the first direction; and a sixth antenna leg supported by the printed circuit board, the sixth antenna leg having a length and a width, with a first end region of the sixth antenna leg connected to the second end region of the fifth antenna leg, and with a second end region of the sixth antenna leg extending away from the first end region of the sixth antenna leg in a direction opposite to the first direction and operatively connected to a ground plane of the printed circuit board.

2. The printed circuit board implemented antenna of claim 1, wherein the length of the second antenna leg is shorter than the length of the first antenna leg.

3. The printed circuit board implemented antenna of claim 1, wherein the length of the fourth antenna leg is longer than the length of each of the first antenna leg, the second antenna leg and the third antenna leg.

4. The printed circuit board implemented antenna of claim 1, wherein the width of the second antenna leg is less than the width of the first antenna leg.

5. The printed circuit board implemented antenna of claim 1, wherein the width of the sixth antenna leg is less than the width of each of the first antenna leg, the second antenna leg, the third antenna leg and the fourth antenna leg.

6. The printed circuit board implemented antenna of claim 1, wherein:

the first antenna leg has a length of about 5 millimeters and a width of about 1.25 millimeters;

the second antenna leg has a length of about 4 millimeters and a width of about 1 millimeter;

the third antenna leg has a length of about 2 millimeters and a width of about 1 millimeter;

the fourth antenna leg has a length of about 10 millimeters and a width of about 1 millimeter;

the fifth antenna leg has a length of about 4 millimeters and a width of about 0.4 millimeter; and the sixth antenna leg has a length of about 5 millimeters and a width of about 0.4 millimeter.

7. The printed circuit board implemented antenna of claim 1, providing a return loss of less then −10 dB at 2.4 GHz.

8. The printed circuit board implemented antenna of claim 1, wherein the first antenna leg, the second antenna leg, the third antenna leg, the fourth antenna leg, the fifth antenna leg and the sixth antenna leg collectively fit within a rectangular area on the printed circuit board of less than 80 millimeters square.

9. The printed circuit board implemented antenna of claim 1, wherein the first antenna leg, the second antenna leg, the third antenna leg, the fourth antenna leg, the fifth antenna leg and the sixth antenna leg collectively fit within a rectangular area on the printed circuit board, and wherein the rectangular area on the printed circuit board is free from a ground plane.

10. The printed circuit board implemented antenna of claim 1, wherein the first antenna leg, the second antenna leg, the third antenna leg, the fourth antenna leg, the fifth antenna leg and the sixth antenna leg are formed from metal traces of the printed circuit board.

* * * * *